US010648822B2

(12) United States Patent
Newlin et al.

(10) Patent No.: US 10,648,822 B2
(45) Date of Patent: *May 12, 2020

(54) SYSTEMS AND METHODS FOR SIMULTANEOUS ELECTRONIC DISPLAY OF VARIOUS MODES OF TRANSPORTATION FOR VIEWING AND COMPARING

(71) Applicant: Verizon Patent and Licensing Inc., Basking Ridge, NJ (US)

(72) Inventors: Meghan Newlin, Boulder, CO (US); Cristian J. Whitney, Denver, CO (US); Austin Brown, Denver, CO (US); Kent Dennis Hollrah, Denver, CO (US); Lindsay E. Moore, Erie, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 145 days.

This patent is subject to a terminal disclaimer.

(21) Appl. No.: 15/363,840

(22) Filed: Nov. 29, 2016

(65) Prior Publication Data

US 2017/0074669 A1    Mar. 16, 2017

Related U.S. Application Data

(63) Continuation of application No. 14/682,626, filed on Apr. 9, 2015, now Pat. No. 9,534,913.

(51) Int. Cl.
*G01C 21/34* (2006.01)
*G01C 21/20* (2006.01)
*G01C 21/36* (2006.01)

(52) U.S. Cl.
CPC ......... *G01C 21/3423* (2013.01); *G01C 21/20* (2013.01); *G01C 21/3676* (2013.01); *G01C 21/3679* (2013.01)

(58) Field of Classification Search
CPC .................................... G01C 21/20; G01C 21/3423; G01C 21/3676; G01C 21/3679

(Continued)

(56) References Cited

U.S. PATENT DOCUMENTS 5,948,040 A * 9/1999 DeLorme ............... G01C 21/36
340/990
8,620,532 B2 * 12/2013 Curtis ................. G06Q 30/0282
701/50

(Continued)

OTHER PUBLICATIONS

Extended European Search Report dated Jul. 21, 2015, in corresponding European Patent Application No. 15 15 8040.4, filed on Mar. 6, 2015 (6 pages).

*Primary Examiner* — Anne Marie Antonucci
*Assistant Examiner* — James E Stroud

(57) ABSTRACT

Systems and methods are disclosed for generating and displaying a comparison of multiple modes of transportation for reaching a destination. One method includes receiving a start location and a destination location, and stops in between, receiving information related to at least one third party operated mode of transportation from a third party determining data related to the at least one third party operated mode of transportation and at least one user operated mode of transportation, generating and displaying determined data for at least one option for each of the plurality of modes of transportation, receiving a selection of a sort category, and determining the option of each mode of transportation to be displayed and an order in which the modes of transportation are displayed based on the selection of the sort category.

20 Claims, 19 Drawing Sheets

(58) Field of Classification Search
USPC .......................................................... 701/533
See application file for complete search history.

(56) References Cited

U.S. PATENT DOCUMENTS

| | | | | |
|---|---|---|---|---|
| 8,694,240 | B1* | 4/2014 | Lookingbill | G01C 21/00 |
| | | | | 455/456.1 |
| 8,738,292 | B1* | 5/2014 | Faaborg | G01C 21/26 |
| | | | | 701/117 |
| 9,217,647 | B2* | 12/2015 | Pech | G01C 21/3423 |
| 9,234,765 | B1* | 1/2016 | Padovitz | G01C 21/20 |
| 9,251,168 | B1* | 2/2016 | Tomkins | G06F 17/30241 |
| 9,273,970 | B2* | 3/2016 | Graells | G01C 21/26 |
| 9,273,974 | B1 | 3/2016 | Graelis | |
| 9,285,234 | B1* | 3/2016 | Graf | G01C 21/3667 |
| 9,349,112 | B2* | 5/2016 | Gazdzinski | G06Q 10/08 |
| 9,389,086 | B2* | 7/2016 | Hashem | G01C 21/20 |
| 2007/0078729 | A1* | 4/2007 | Brown | G06Q 10/02 |
| | | | | 705/5 |
| 2009/0005965 | A1* | 1/2009 | Forstall | G01C 21/3484 |
| | | | | 701/533 |
| 2009/0178008 | A1* | 7/2009 | Herz | G06F 3/04817 |
| | | | | 715/840 |
| 2012/0254804 | A1* | 10/2012 | Sheha | G06Q 30/02 |
| | | | | 715/834 |
| 2015/0294431 | A1* | 10/2015 | Fiorucci | G06Q 50/26 |
| | | | | 705/13 |
| 2016/0163195 | A1* | 6/2016 | O'Hara | G08G 1/123 |
| | | | | 340/994 |

* cited by examiner

SYSTEMS AND METHODS FOR SIMULTANEOUS ELECTRONIC DISPLAY OF VARIOUS MODES OF TRANSPORTATION FOR VIEWING AND COMPARING

PRIORITY

This application is a continuation of and claims the benefit of priority from U.S. application Ser. No. 14/682,626, filed Apr. 9, 2015, which is incorporated by reference in its entirety.

TECHNICAL FIELD

The present disclosure relates generally to determining and displaying available modes of transportation for navigating geographical routes and, more particularly, to simultaneously displaying data related to multiple modes of transportation.

BACKGROUND

In order to provide travelers or commuters with information related to a navigation route, traditional mapping services calculate routes using preset methods based on known mapping information, such as POI locations, road locations, and physical distances between locations and nearby connected roads. Typical mapping systems generate only walking, biking, or driving directions using that mapping information. Users generally have to rely on separate applications to view data related to third party operated modes of transportation, such as public transportation and application-initiated third-party transportation. To date, users have no way to easily compare multiple modes of transportation, at one time, in one screen and/or one client application, not to mention the various costs, times, ETAs, wait times, elevation changes, number of transfers, convenience, and many other factors associated with selecting between those multiple modes of transportation.

Accordingly, a need exists for systems and methods for generating and displaying information related to multiple, alternative modes of transportation from an origin to a destination. More specifically, a need exists for systems and methods for presenting data from multiple sources of information, for enabling users to make comparisons and informed decisions when selecting between multiple, alternative modes of travel.

SUMMARY OF THE DISCLOSURE

Embodiments of the present disclosure include systems and methods for executing a comparison tool that delivers information about modes of transportation available for travel between a start location and a destination location. In some embodiments, additional stops may be included between the start and destination location. For example, a user may request additional stops (e.g., stopping at the store on the way home) and/or the route may require additional stops (e.g., a user may have to walk to the B-cycle station to pick up a bike). Specifically, embodiments of the present disclosure include systems and methods for displaying data related to multiple modes of transportation on a single graphical user interface (GUI).

According to certain embodiments, methods are disclosed for generating and displaying information related to multiple, alternative modes of transportation from an origin to a destination. One method includes receiving a start location and a destination location; receiving information related to at least one third party operated mode of transportation from a third party; determining data related to the at least one third party-operated mode of transportation and at least one user-operated mode of transportation; generating and displaying determined data for at least one option for each of the plurality of modes of transportation; receiving a selection of a sort category; and determining the option of each of the plurality of modes of transportation to be displayed and an order in which the plurality of modes of transportation are displayed based on the selection of the sort category.

According to certain embodiments, systems are disclosed for generating and displaying information related to multiple, alternative modes of transportation from an origin to a destination. One system includes a data storage device storing instructions; and a processor configured to execute the instructions to perform a method including: receiving a start location and a destination location; receiving information related to at least one third party operated mode of transportation from a third party; determining data related to the at least one third party operated mode of transportation and at least one user operated mode of transportation; generating and displaying determined data for at least one option for each of the plurality of modes of transportation; receiving a selection of a sort category; and determining the option of each of the plurality of modes of transportation to be displayed and an order in which the plurality of modes of transportation are displayed based on the selection of the sort category.

According to certain embodiments, a non-transitory computer readable medium is disclosed as storing instructions that, when executed by a computer, cause the computer to perform a method, the method comprising: receiving a start location and a destination location; receiving information related to at least one third party operated mode of transportation from a third party; determining data related to the at least one third party operated mode of transportation and at least one user operated mode of transportation; generating and displaying determined data for at least one option for each of the plurality of modes of transportation; receiving a selection of a sort category; and determining the option of each of the plurality of modes of transportation to be displayed and an order in which the plurality of modes of transportation are displayed based on the selection of the sort category.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

The present disclosure is directed to overcoming one or more of the above referenced issues and relates generally to improving user interaction with a navigation system. Specifically, the present disclosure is directed to systems and methods for generating and displaying data related to multiple modes of transportation for travelling from a start location to a destination location. The present disclosure involves enabling a user to view, e.g., displayed on a single screen, comparison data relating to at least one option for each of multiple modes of transportation. These modes of transportation may include traditional modes, like driving and walking, as well as nontraditional or third party operated modes, such as taxis, car share, bike share, and ride share.

In one embodiment, the application may display several (e.g., two, three, or more) modes of transportation for comparison. For example, a mobile application may display two or more so-called "quick directions" for each of multiple commonly used modes of transportation, including, e.g., "Drive," "Walk," and "Public." The two or more modes selected for display and comparison may be customizable. For example, if a user does not have a car, the displayed modes for comparison may be "Bike," "Walk," and "Public." If the city has no public transportation, the displayed modes for comparison may be "Drive," "Bike," and "Car Share."

Figure 8:
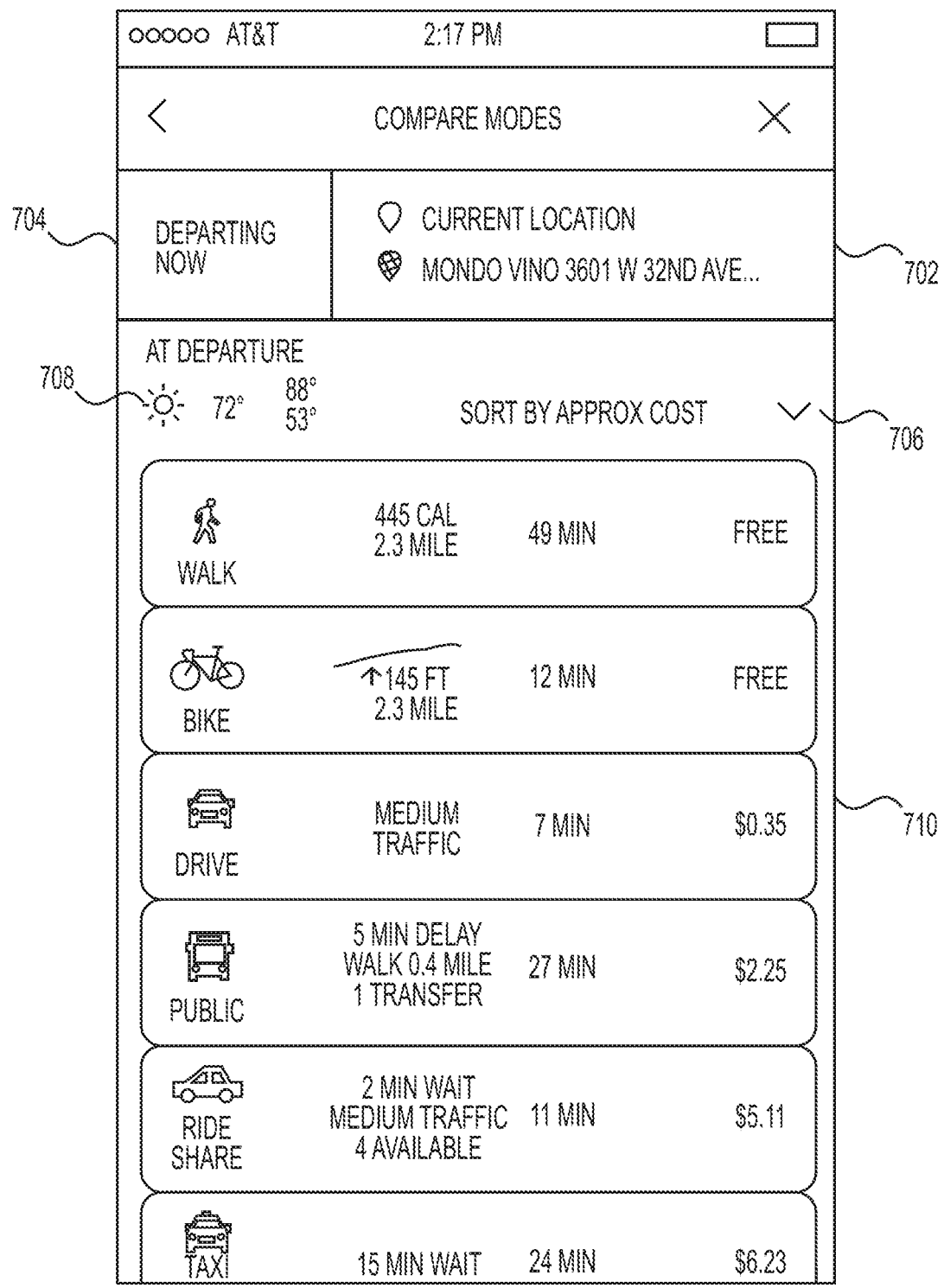
FIG. 8 is a schematic view of an exemplary GUI for display and comparison of at least one option for each of the various modes of transportation, according to an exemplary embodiment of the present disclosure.
Figure 17:
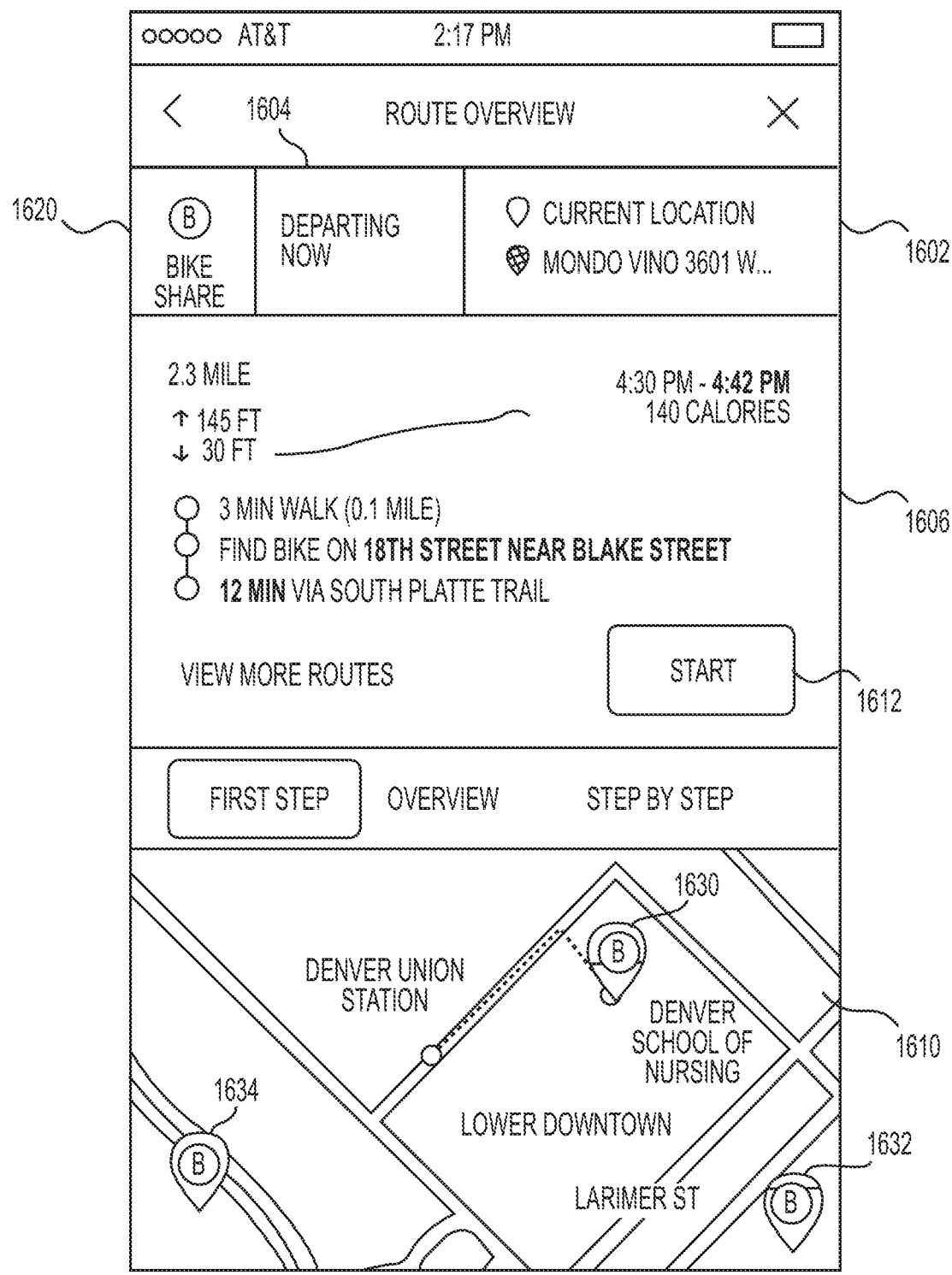
FIG. 17 is a schematic view of an exemplary GUI for display of both (1) multiple options of a transportation mode, e.g., for a bike share service, and (2) a way to access a selected option for the bike share service, according to an exemplary embodiment of the present disclosure.

In some embodiments, data related to options utilizing multiple modes may be displayed (e.g., within available modes of transportation section 710 of FIG. 8). For example, there may be several routes that use more than one mode of transportation to travel from a start location to a destination location (and/or additional stops there between). For example, one option may be to drive to a train station, take the train to another city, use a bike share at the train station, and then bike to the destination location. In another example, another option may be to bike from a start location to a car share car and then drive to the destination location. Another option to be displayed may be to get a ride share to drive to a shuttle bus pick up location, ride the shuttle bus to an airport, and fly to a destination location. A further option for display may be to walk to a local train station (e.g., the subway, metro, etc.), take the local train to the end of the line, and take a cab the rest of the way home (e.g., destination location). FIGS. 12, 13, 14, and 17 include exemplary illustrations of the above described multi-modal options. With each of these options, a user must, walk, bike, drive, etc. in order access a second mode of transportation, e.g., a bus stop (FIG. 12), an intercity train station (FIG. 13), a car share car (FIG. 14), and a bike share bike (FIG. 17). The above are merely examples and options/routes for display may include any number and/or combination of modes of transportation.

Data related to each mode of transportation may be displayed to the user for direct comparison and evaluation of each displayed mode. For example, travel time and/or the monetary cost for the user to travel from the start to the destination location for each mode of transportation may be displayed. This data may additionally or alternatively include any information the user expressly requests and/or the application developer chooses to display for various modes of transportation. Moreover, the type of displayed data may depend on the mode displayed (e.g., altitude change may be displayed for a bike route, but may not be of interest when a user is evaluating a bus route).

In some cases, the information displayed for comparison may be sorted. If a user selects a category to sort by, the information displayed may be varied in a number of ways. For example, sorting may determine which modes of transportation are displayed, the order the modes are displayed, which option (e.g., route, car type, bus line) is displayed for each mode, and/or the data displayed for each mode. In one embodiment, a user may request to sort the displayed options for each mode of transportation by ETA, travel time, cost, convenience, "pain," weather, length of walking, elevation changes, reliability, or context (e.g., a user may indicate he/she is with friends and thus the easiest routes and/or routes with the least traffic may be prioritized), etc. In some cases, the system may determine which option (e.g., route, car, bus line) to display for each mode of transportation based on one or more sort options, weighting factors, and/or preferences selected by the user and/or application. For example, if the user prioritizes or sorts by cost, the system may select the cheapest option for each transportation mode, before sorting the modes by cost. If the user prioritizes or sorts by ETA, it may select the option with the soonest ETA for each transportation mode, before sorting the modes by ETA.

This disclosure further includes importing and/or accessing data from third party application program interfaces (APIs). For example, the "public" data may be imported from a city's public transportation website. In addition to public transportation, data related to ride sharing, bike sharing, taxis, trains, buses, planes, car rentals, etc., may be imported from third party APIs.

Reference will now be made in detail to the exemplary embodiments of the disclosure, examples of which are illustrated in the accompanying drawings. Wherever possible, the same reference numbers will be used throughout the drawings to refer to the same or like parts.

Figure 1:
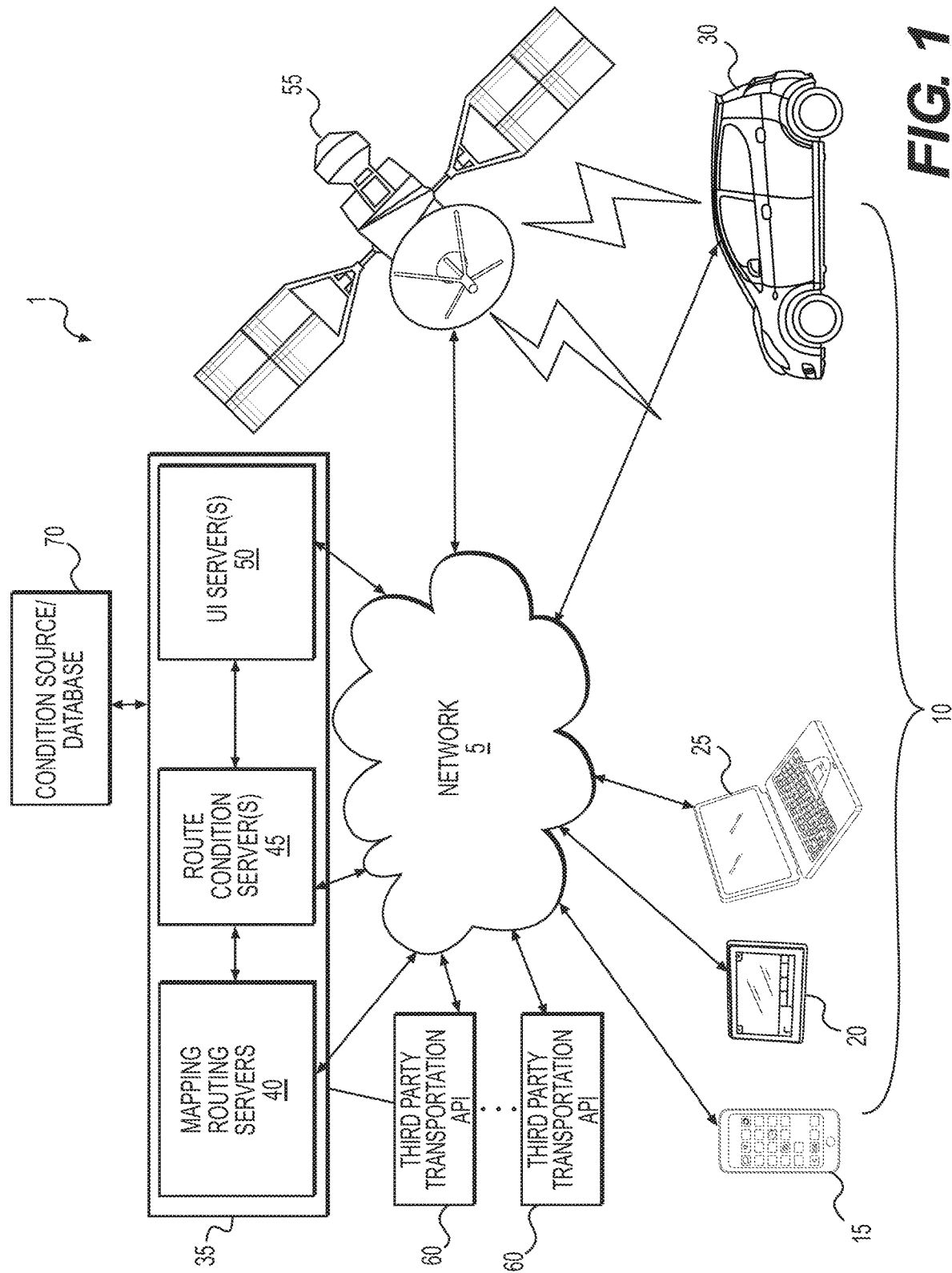
FIG. 1 is a block diagram of a communications system configured to present users with data related to various modes of transportation, according to an exemplary embodiment of the present disclosure.

Referring now to the figures, FIG. 1 is a block diagram of a communications system 1 configured to enable comparisons of at least one option of multiple modes of transportation. In general, system 1 may include of plurality of entities, devices, databases, and/or servers configured to communicate through a network 5, such as the Internet. The example of system 1 illustrated in FIG. 1 includes various user devices 10, servers 35, satellite 55, third party transportation APIs 60, and condition source/database 70.

In the example shown in FIG. 1, user devices 10 may include one or more mobile electronic devices 15, which may be a smartphone, a personal digital assistant ("PDA"), a tablet computer, or other type of mobile computing device, such as a device having a touchscreen display. Mobile device 15 and computer 25 may each be equipped with or include, for example, a GPS receiver for obtaining and reporting location information, e.g., GPS data, via network 5 to and from any of servers 35 and/or one or more GPS satellites 55. GPS device 20 may be a dedicated GPS navigation device having an integrated GPS receiver for exchanging location information with GPS satellite(s) 55 for purposes of tracking a current geographic location of GPS device 20 and its user. GPS device 20 may be a portable or handheld GPS device. Vehicle navigation system 30 may be implemented as, for example, a GPS based in-dash navigation system integrated with the vehicle 30. Such an in-dash navigation system may provide various functions, including a navigation function, via a center console display installed within the vehicle.

However, it should be noted that each of user devices 10, including mobile device 15, GPS device 20, computer 25, and/or vehicle navigation system 30, may be implemented using any type of electronic device configured to send and receive data, including location data (e.g., in the form of latitude and longitude coordinates), to and from a system of servers 35 over network 5. The user input device(s) may include any type or combination of input/output devices, such as a display monitor, touchpad, touchscreen, microphone, camera, keyboard, and/or mouse.

Furthermore, it should be noted that any of various techniques may be used to derive geographic location information for any of user devices 10, particularly in cases where GPS data may not be available, for example, in urban canyons or other locations where line-of-sight to GPS satellites may not be feasible. Examples of other techniques that may be used for deriving location information for any of user devices 10 include, but are not limited to, cell identification (e.g., using Cell ID), cellular tower triangulation, multilateration, Wi-Fi, or any other network or handset based technique for deriving location information for a mobile device. The various user devices 10 may also communicate with each other by any suitable means (e.g., via Wi-Fi, radio frequency (RF), infrared (IR), Bluetooth, Near Field Communication, or any other suitable means) to send and receive location and other information. For example, a mobile device 15 may communicate with GPS device 20 or vehicle navigation system 30.

In one embodiment, each of user devices 10 may be configured to execute a mobile client application for providing various functions of a mapping service hosted at mapping sever systems 35. Examples of such functions may include, but are not limited to, determining available modes, determining various routes or options for each available mode, viewing and manipulating digital maps, and route planning and navigation. The client application executable at each user device 10 may be configured to process and execute instructions and save data in memory. The client application may also be configured to provide the various mode or option comparisons and/or mapping functions to the user through a GUI, such as the GUIs of FIGS. 3-18, presented via a display, e.g., capacitive touch-screen display, coupled to each user device 10. The client application executable at each user device may be a standalone mobile application or may be configured to execute within, for example, a web browser based on web page data loaded within the browser or similar application executable at each of user devices 10.

For example, the user device 10 may receive information via the network 5 from the system of servers 35, having one or more servers such as mapping routing servers 40, route condition servers 45, user interface servers 50, and/or any other suitable servers. Each server in the system of servers 35, including mapping routing server 40, route condition server 45, and UI server 50 may each represent any of various types of servers including, but not limited to a web server, an application server, a proxy server, a network server, or a server farm. Each server in the system of servers 35 may be implemented using, for example, any computing systems configured for serving data to other computing devices including, but not limited to, user devices 10 (including mobile device 15, GPS device 20, and computer 25) or any other computing device (not shown) via network 5. Such a computing system can include, but is not limited to, a server device having a processor and memory for executing and storing instructions. The memory may include any type of random access memory (RAM) or read-only memory (ROM) embodied in a physical storage medium, such as magnetic storage including floppy disk, hard disk, or magnetic tape; semiconductor storage such as solid-state disk (SSD) or flash memory; optical disc storage; or magneto-optical disc storage. Software may include one or more applications and an operating system. Hardware can include, but is not limited to, a processor, memory, and graphical user interface display. Each server may also have multiple processors and multiple shared or separate memory components that are configured to function together within, for example, a clustered computing environment or server farm.

The mapping routing server 40 may have a processor configured to retrieve mapping information and generate routing information. Additionally or alternatively, mapping routing server 40 may include a processor configured to retrieve and/or provide data to/from third party transportation APIs 60 such as, for example, those of ride share services, car share services, bike share services, taxis, and/or public transportation. Route condition server 45 may include a processor configured to retrieve route condition information and/or provide route condition information from condition source database 70 or third party sources. Additionally or alternatively, route condition server 45 may have database that is a subset of condition source/database 70 or a separate database of historic average speeds, route terrain, speed limits, current and/or historic traffic data, elevation change along the route, average parking spots, tolls, number/location of police along the path, average distance from parking to destination, etc. The user interface server 50 may be configured to generate and display GUIs disclosed with respect to FIGS. 3-18, receive and process user input, such as mode, partner, route, and/or condition preferences.

The mapping routing server 40 may receive information regarding a user's trip, such as a start location, destination location, and any user route and/or mode preferences directly from the user device 10 via the network 5 or indirectly via the user interface server 50. The mapping routing server 40 may save the information in memory, such as a computer readable memory. Mapping routing server 40 may then calculate various routes and determine modes of transportation from the received information. This may be determined by comparing the received information to known routes, such as roadways and bike paths, existing and internal algorithms, and/or by accessing third party APIs, e.g., third party transportation APIs 60. For example, the mapping routing server 40 may be in communication with one or more other servers, such as the route condition server 45 and/or external servers, such as servers of third party transportation APIs 60. The third party transportation APIs 60 may include those of slug lines, ride share services, car share services, bike share services, public transportation, airlines, boat services, ferries, intercity bus companies, intercity train companies, and any other APIs affiliated with information related to travelling from one location to another. The information provided by third party transportation APIs 60 may be displayed to the user or used to derive information, such as routes, distances, durations, ETA, etc., to be displayed to the user. For example, a ride share service may provide wait time data that may be displayed in a compare modes screen (e.g., FIG. 8)

The route condition server 45 and/or condition source/database 70 may store or have access to data from other users, traffic reports, weather reports, police reports, road construction, and/or any other source of relevant information. The route condition server 45 may process the information for display on the user device 10. As will be described in further detail below, such a condition source/database 70 may be used (e.g., by route condition server 45 and/or mapping routing server 40) to store and retrieve data related to certain conditions along the route. The data associated with the routes or points along the route may include, for example, current speeds, historic average speed, posted speed limits, construction zones, speed cameras, location of police officers, stopped vehicles, current traffic, parking spots at destination, terrain, elevation changes, accidents, weather, special events, and/or rush hour. In some examples, system 1 may access and retrieve the traffic or route condition data stored or developed on condition source or database 70 via a network 5. The retrieved traffic and/or condition data may be used for display and/or processing by one or more user devices 10, such as a mobile device 15 (e.g., mobile phone, personal digital assistant, tablet computer), a GPS device 20, a computer (laptop, desktop, tablet) 25, an in-vehicle navigation system 30, and/or any device connected to a network 5, such as the Internet, according to an exemplary embodiment of the present disclosure.

Figure 2:
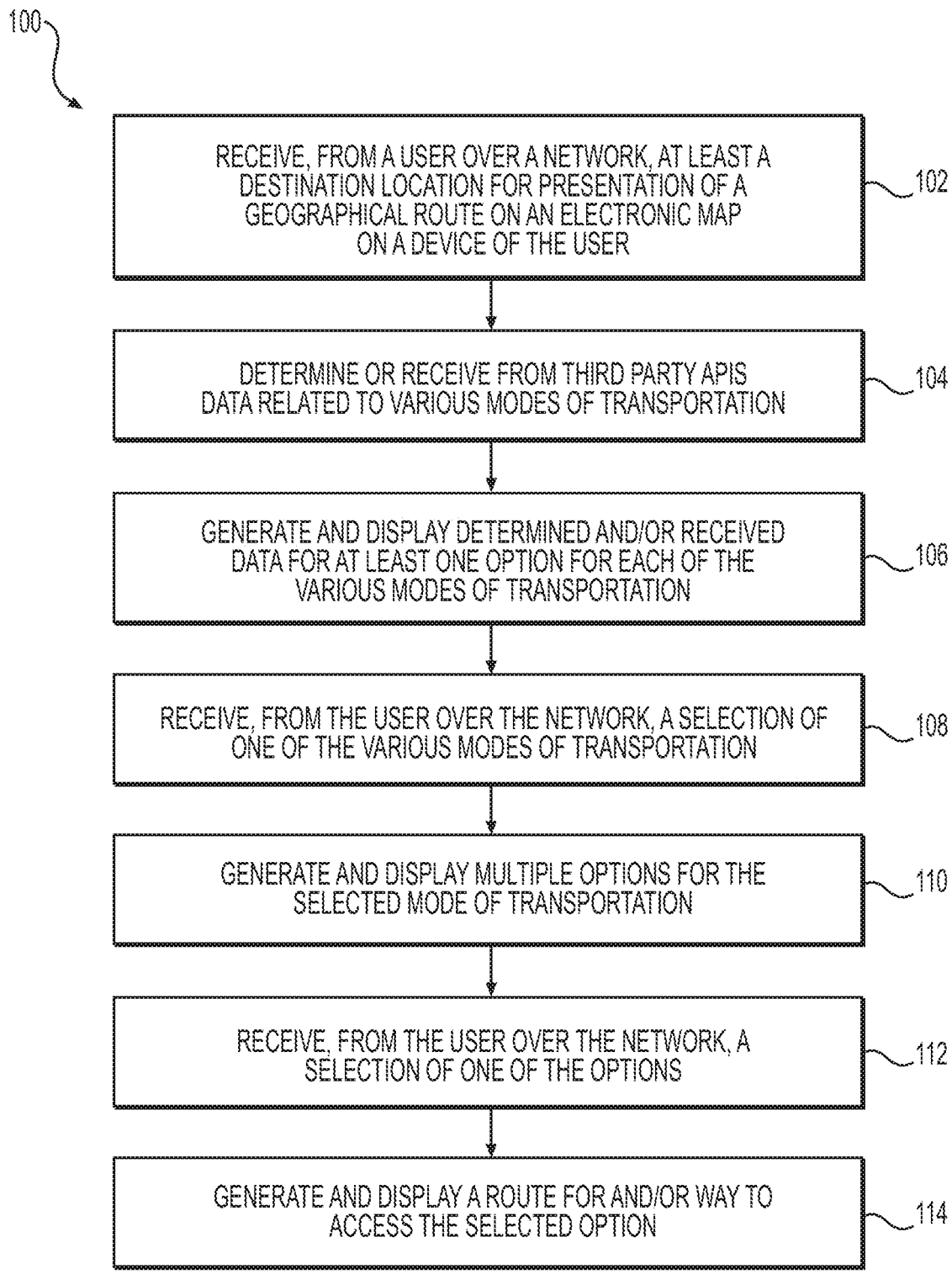
FIG. 2 is a flow diagram of an exemplary method of generating and displaying various modes of transportation, multiple options for a selected mode of transportation, and a route for and/or way to access a selected option of a mode of transportation, according to an exemplary embodiment of the present disclosure.

FIG. 2 is a process flow diagram of an exemplary method 100 for generating and displaying data related to multiple modes of transportation available for travelling to a destination. For purposes of discussion, method 100 will be described using system 1 of FIG. 1 (including mapping routing server 40, route condition server 45, and condition database/source 70), as described above, but method 100 is not intended to be limited thereto. As shown in FIG. 2, method 100 includes steps 102, 104, 106, 108, 110, 112, and 114. However, it should be noted that method 100 may include more or fewer steps as desired for a particular implementation. In an example, one or more of the above-listed steps of method 100 may be executed by servers 35 and/or condition source/database 70 of FIG. 1, as described above. However, method 100 is not intended to be limited thereto, and the steps of method 100 may be performed by any server or other type of computing device having at least one processor, a memory, and a network communication interface for sending and receiving information from one or more user devices.

FIGS. 3-18 are illustrations of exemplary GUIs produced, e.g., by UI server 50 during various steps of method 100. These GUIs may be provided by a mapping service provider or any other entity and may include various graphical icons and visual indicators. The GUIs may be presented on any suitable electronic device having a display. In some embodiments, the GUIs may be accessible (e.g., for viewing and interacting) on a website accessible by an electronic device. In other embodiments, the GUIs may be accessible on a mobile navigation application of an electronic device, e.g., user devices 10.

Method 100 may begin at step 102, which may include receiving, from a user over a network, a destination location for presentation of a geographical route on an electronic map on a device of the user. The user may input both a start and destination location, or for example, the start location may be the current location of the device. In some embodiments, the user may input an address, an intersection, geographic coordinates, or a point of interest as the destination location. In step 104, various available modes of transportation may be determined and/or received from third party APIs. In some embodiments, the modes of transportation may be determined by, for example, mapping routing server 40 of FIG. 1. The various modes of transportation may be received from, for example, third party transportation APIs 60 of FIG. 1.

Figure 3:
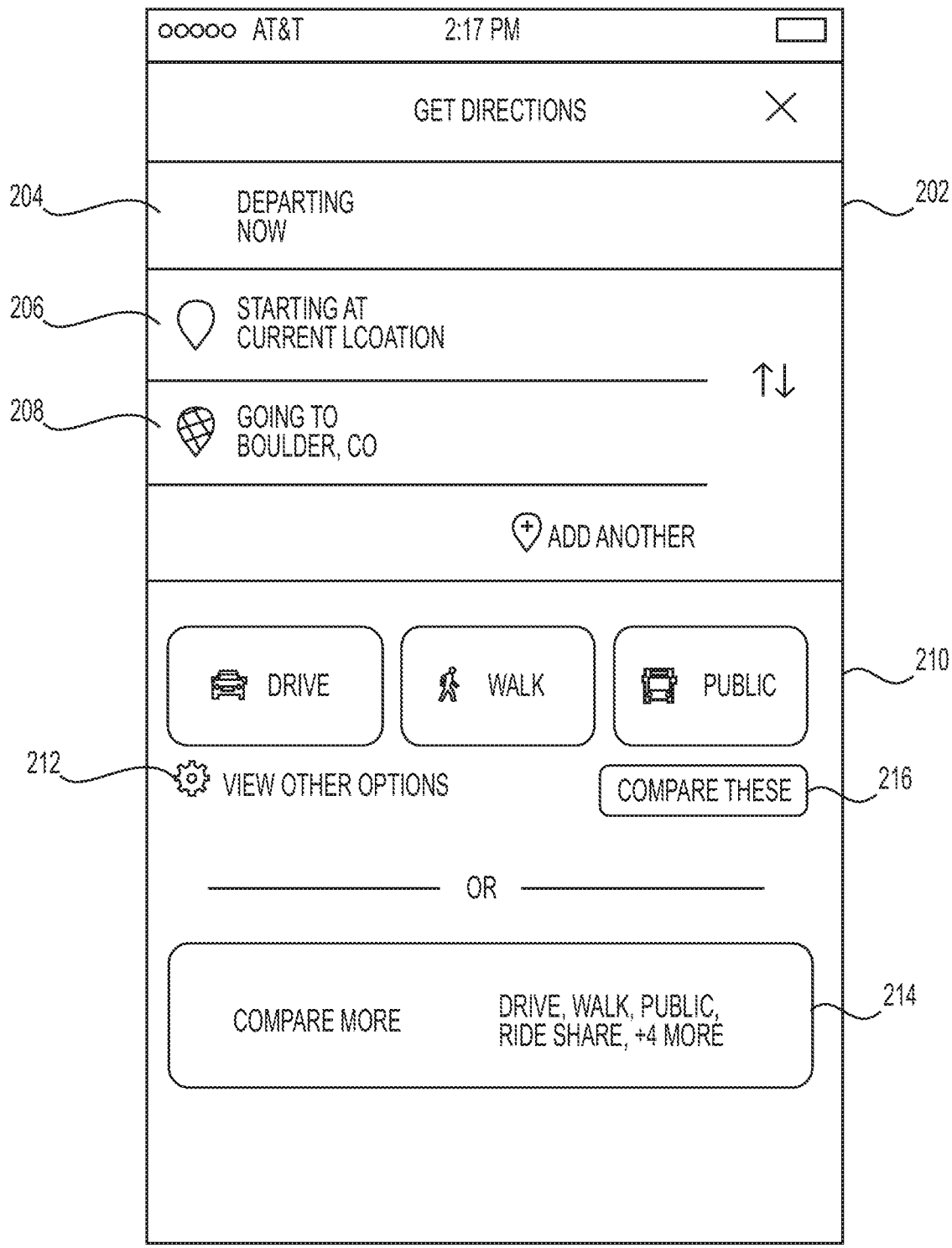
FIG. 3 is a schematic view of an exemplary GUI for user input related to the desired travel and available modes of transportation for selection or for comparison, according to an exemplary embodiment of the present disclosure.

In some embodiments, multiple and/or available modes of transportation may then be displayed. FIG. 3 illustrates a GUI for display of various modes of transportation. As shown in FIG. 3, the GUI may include route information section 202, a quick directions section 210, "View Other Options" icon 212, "Compare These" icon 216, and/or "Compare More" icon 214. Route information section 202 may include time of departure 204, starting location 206, and/or destination location 208. A user may set the time of departure section 204 to be the current time or any time in the future. A default setting may be set for the time of departure section 204. In some examples, the default setting for the time of departure may be the current time, the next 5, 10, or 15 minute increment, and/or a common time for this or other users to request directions (e.g., setting the time of departure from a downtown location to 6:15 p.m. because this user often leaves downtown at 6:15 p.m.). Starting location 206 may include the current location, as shown in FIG. 3, or an address, POI, geographic coordinate, or intersection input by the user.

The quick directions section 210 may include any number and/or combination of transportation modes available for selection. In some examples, these may be the top/best/favorite modes of transportation, as determined by the application developer and/or as set by the user. In some examples, quick directions section 210 may include only one mode of transportation. The singular mode of transportation displayed in quick directions section 210 may be determined in any way including, but not limited to, randomly, assumed by the developer, sponsored by a partner, and/or as recommended based on a variety of factors including, but not limited to the start and destination locations.

In the example illustrated in FIG. 3, the modes of transportation available in the quick directions section 210 may include driving, walking, or taking public transportation. In examples in which an application developer sets the modes of transportation in the quick directions section 210, the application developer may use any criteria. In some examples, an application developer may receive compensation for adding a partner's services (e.g., a specific car share company) and the quick directions section 210 may be initially set with that partner's icon. In some examples, a user's current location may not be accessible to public transportation and the application developer may not include public transportation in the quick directions section 210.

Figure 4:
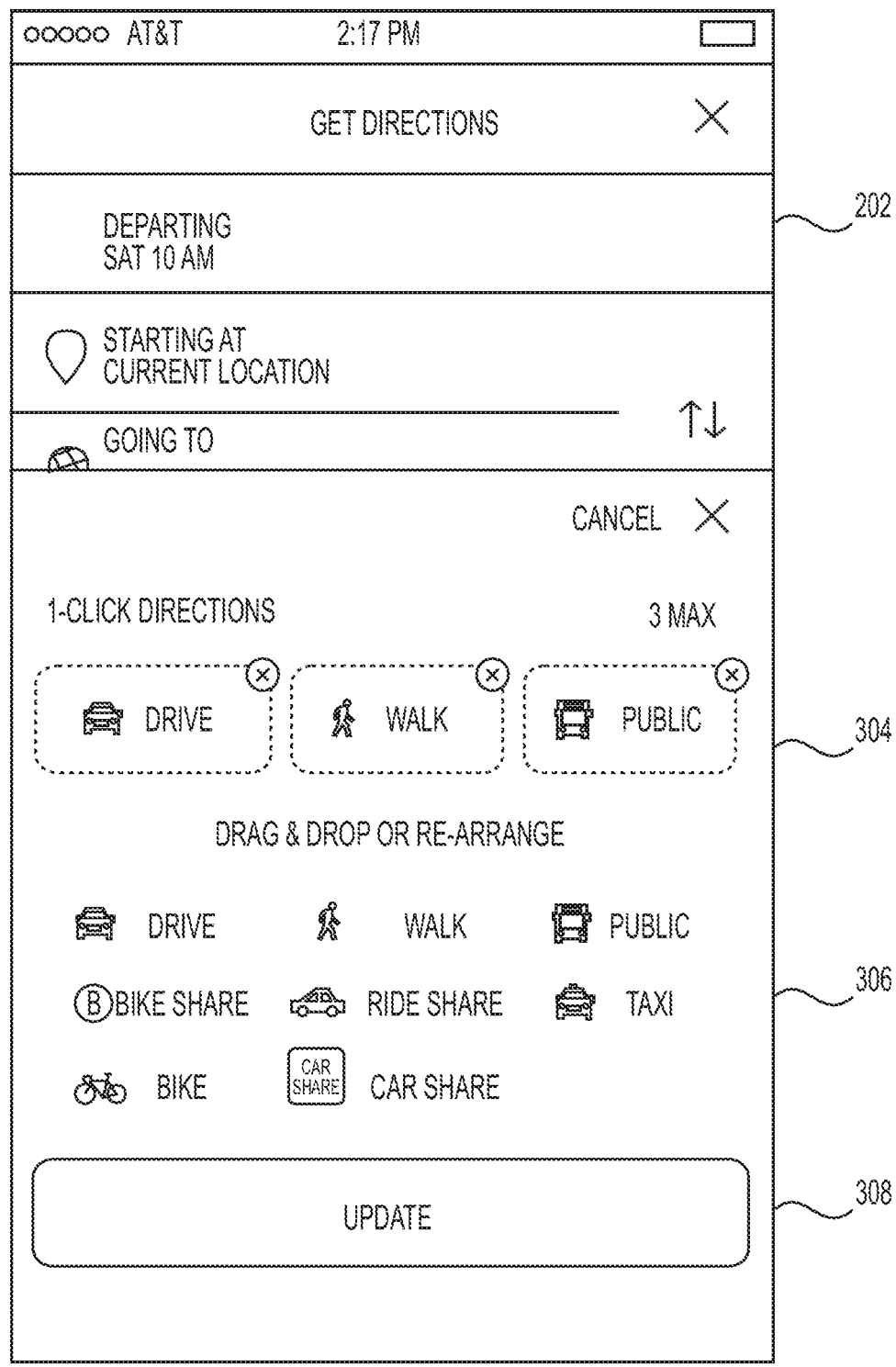
FIG. 4 is a schematic view of an exemplary GUI for enabling user customization of available and/or comparable modes of transportation, according to an exemplary embodiment of the present disclosure.
Figure 5:
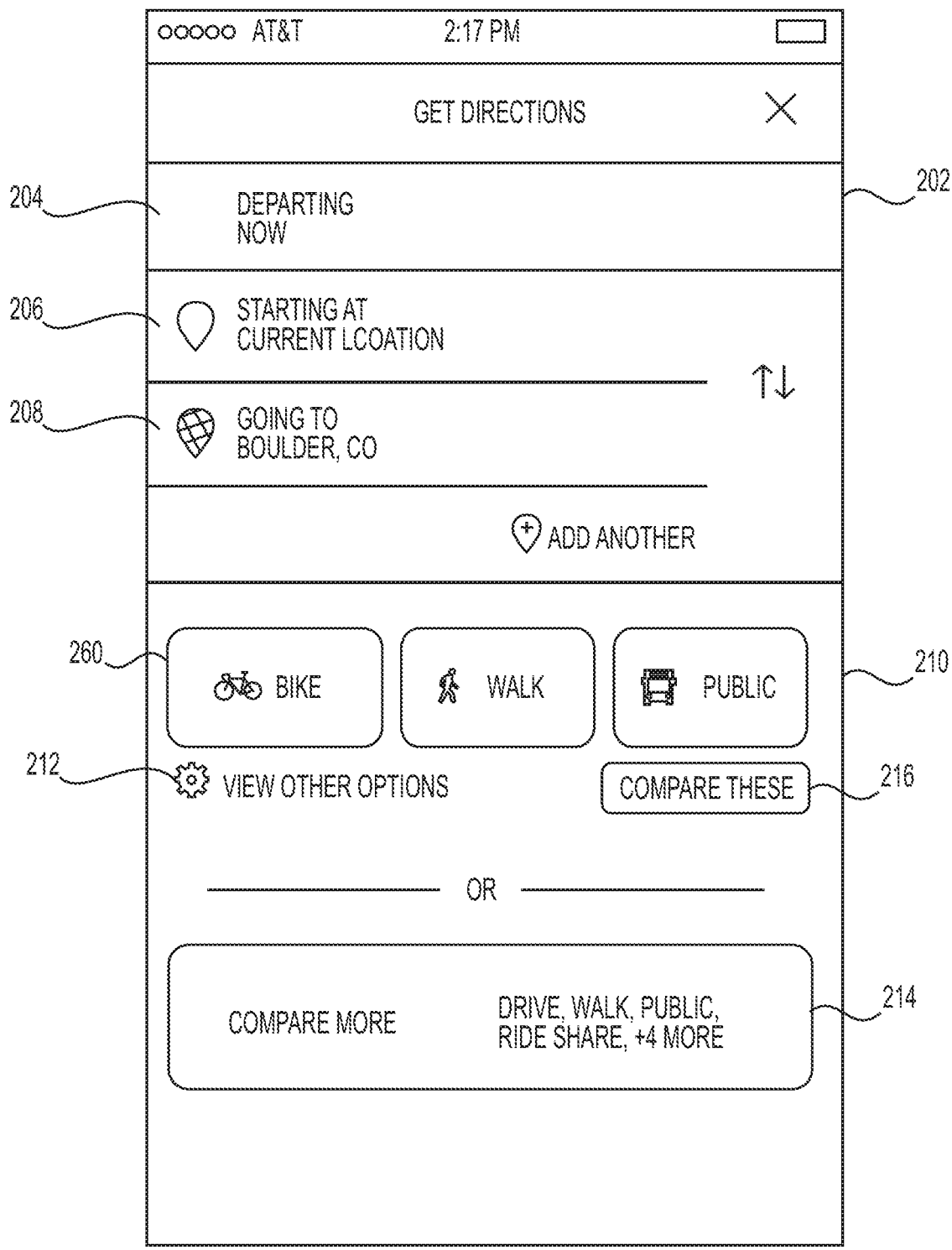
FIG. 5 is a schematic view of an exemplary GUI for user input related to the desired start and end points, and waypoints/stops along the route, desired and/or estimated time/date of departure/arrival, and customized modes of transportation for selection or for comparison, according to an exemplary embodiment of the present disclosure.
Figure 6:
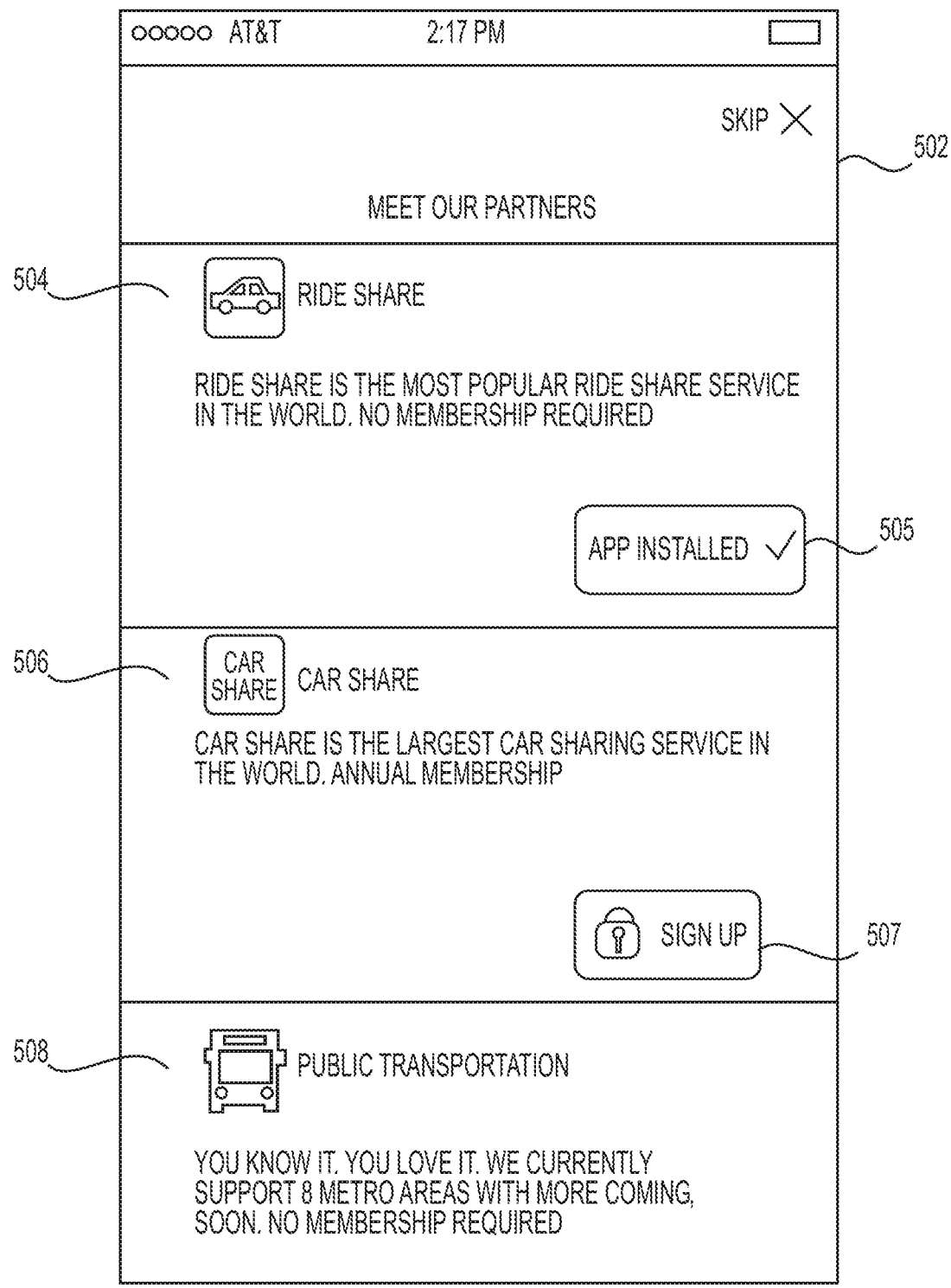
FIG. 6 is a schematic view of an exemplary GUI for display of transportation partners and information related to the partners' client application/membership, according to an exemplary embodiment of the present disclosure.

In some embodiments, the quick directions section 210 may be customized by the user. For example, a user may select the view other options icon 212. Selecting the view other options icon 212 may result an overlay, pop-up, and/or new GUI consistent with that shown in FIG. 4. As shown in FIG. 4, a portion of the route information section 202 may be visible, but a section for customization may be displayed over the GUI of FIG. 3. This section may include the current quick directions modes 304, the alternative modes for quick directions 306, and an update button 308. The user may "drag and drop" and/or "rearrange" icons within the current quick directions modes 304 and/or alternative modes for quick direction 306 to add an alternative mode from the alternative modes section 306 to the current quick direction modes 304. In one example, the user may not have a car. In such an example, the user may select the "x" within the "Drive" icon of the current quick directions modes 304. Such a selection may remove "Drive" from the quick directions options. In the example in which a user does not have a car, but does have a bike, a user may add the "Bike" mode from the alternative modes 306 into current quick directions modes 304. Once the user arranges the quick directions modes 304 as desired, the user may select the update icon to finalize the current quick directions modes 304. In the example in which a user does not have a car, but does have a bike, the user may arrange and update the quick directions section 210 as shown in FIG. 5. In FIG. 5, the bike icon 260 has replaced the "Drive" icon within quick directions section 210.

At any point (e.g., before or after customization) a user may select a mode of transportation within the quick directions section 210 (e.g., bike icon, walk icon, or public transportation icon of FIG. 5), "Compare These" icon 216, and/or "Compare More" icon 214. Selecting a single mode of transportation within the quick directions section 210 may result in a GUI that displays a route and/or a way to access directions with the selected mode (e.g., direction to a metro station or the ability to request a ride share car). For example, selecting the "Drive" icon within quick directions section 210 may result in a GUI similar to that of FIG. 15, selection of the "Bike" icon may result in a GUI similar to that of FIG. 18, and so on.

Selecting the "Compare These" icon 216 may result in a GUI that displays one or more types of mode comparison data (e.g., cost, time of arrival, wait time, calories, carbon impact, etc.) of at least one option (e.g., a route, car share vehicle, ride share vehicle, bus routes, etc.) for each of the modes of transportation in the quick directions section 210. In some embodiments, only options for the modes of transportation in the quick directions section 210 are displayed (e.g., "Bike," "Walk," and "Public" when "Compare These" element 216 is selected in FIG. 5). In some examples, options for other modes of transportation are also displayed, but the modes in the quick directions section may be listed first.

Selecting the "Compare More" icon 214 may result in a GUI that displays one or more types of comparison data (e.g., cost, time of arrival, wait time, calories, carbon impact, etc.) of at least one option (e.g., a route, car share vehicle, ride share vehicle, bus routes, etc.) for each of the modes of transportation listed within the "Compare More" icon 214, as well as additional/alternative modes of transportation.

In some embodiments, the user may customize the available modes (e.g., quick direction modes and/or compare modes) in any way. For example, a user may be presented with available partners as shown in GUI 502 of FIG. 6. GUI 502 may include ride share section 504, car share section 506, and/or public transportation section 508. In some examples, partners (e.g., modes of transportation connected or in a business relationship with the client application) may additionally or alternatively include bike share, airlines, taxi companies, ferries, boats, intercity buses, intercity trains, car rentals, and/or any other company that assists in transporting a person from one location to another.

In the ride share section 504, the GUI 502 may display the current ride share partners, if any, of the application developer. Examples of ride share partners may include, but are not limited to, Lyft, Uber, DrinkFree, etc. In the car share section 506, the GUI may display a current car share partner, if any, of the application developer. Examples of car share partners may include, but are not limited to, Car2Go, ZipCar, etc. The public transportation section 508 may be included only in locations with public transportation and/or public transportation that allow the application developer to access routes, schedules, delays, etc. In some examples, the public transportation section 508 may be included when the public transportation information is available through an API.

In embodiments in which accessing a partner's services involves the user to installing a client application on the user device and/or signing up for membership, the option to do so may be displayed to the user in a GUI, for example, GUI 502. In the example illustrated in FIG. 6, the ride share partner may prompt the installation of a client application in order to access the ride share services. The installation status button 505 may indicate whether a client application has been installed. If the client application has not been installed, installation status button 505 may indicate the lack of installation by, for example, displaying the text "Install App." In some examples, if the user selects the installation status button 505 when the button indicates a lack of installation, the user may be directed to a web page, an app store, and/or client application to install the related client application. Similarly, in the example illustrated in FIG. 6, the car share partner may prompt a user to have a membership. In such an example, GUI 502 may include a membership button 507. If the user is not a member of the car share service (or has not supplied membership information), the membership button 507 may indicate the lack of membership by, for example, displaying the text "Sign Up." In some examples, if the user selects the membership button 507 when the membership button 507 is indicating a lack of membership, the user may be directed to a web page, app store, and/or client application to sign up for a membership or provide membership verification. If a user's membership has previously been established and/or verified, the membership button 507 may indicate the membership. The membership button may indicate membership by, for example, displaying the text "Member."

Figure 7:
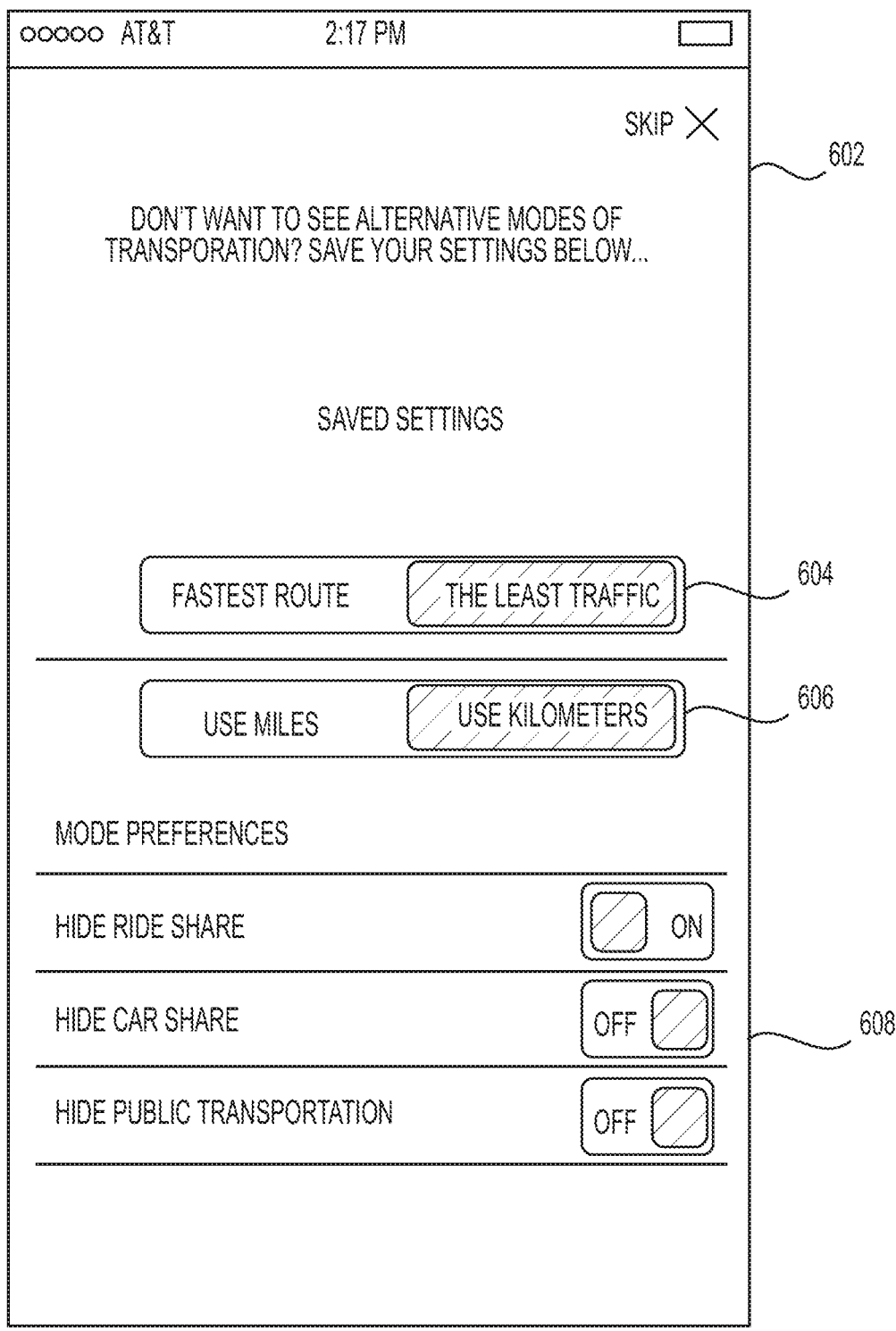
FIG. 7 is a schematic view of an exemplary GUI for display and receipt of adjustable user preferences related to various modes of transportation, including third party transportation partners, according to an exemplary embodiment of the present disclosure.

FIG. 7 illustrates additional and/or alternative ways to customize the application, including by modifying which modes of transportation are displayed, and/or an order the modes of transportation are displayed. GUI 602 of FIG. 7 may include route option choice 604, measurement choice section 606, and/or mode preferences section 608. In the example shown in FIG. 7, a user may select preferences using a sliding button. It should be noted that the sliding buttons of FIG. 7 are merely exemplary. A user may select settings/preferences in any way including, but not limited to, text input, one click buttons, rating, dragging, ranking, etc. In the example illustrated in FIG. 7, route option choice 604 is a user choice between the fastest route and the route with the least traffic. In other examples, a user may choose from the options in route option choice 604, the shortest route, the route with the fewest tolls, and/or the route with the lowest total cost of tolls, and so on. In some examples, the user may be able to scale or weigh route choice options. For example, a user may rate or rank options. Measurement choice section 606 may be a user element enabling the user an alternative option between displaying distance with miles or kilometers.

Mode preferences section 608 of GUI 602 may include options to hide ride share, car share, and/or public transportation. For example, a user may not be a member of an available car share service (or in some examples, the specific car share company partnered with the app from FIG. 6) and may deselect and/or slide the indicator next to "hide car share" to the "on" position. In such examples, the car share options will not be displayed to the user when the user requests a route. In some embodiments, a user may have the option of hiding other forms of transportation, including but not limited to, ride share, public transportation, bike share, bike, and/or walk. The user may be able to vary when and where modes of transportation are hidden. For example, a user may choose to hide public transportation options when in New York City, but not when in Chicago. A user may choose to hide car share options from 7:00-9:00 a.m., because the user does not want to drive during rush hour.

Returning to method 100 of FIG. 2, in step 106, data received and/or determined for at least one option for each of the various modes of transportation may be generated and displayed. FIG. 8 illustrates an example of the displayed data for at least one option of each of the various modes of transportation. In some examples, the GUI of FIG. 8 is displayed due to the selection of the "Compare More" icon 214 of FIG. 3. The GUI of FIG. 8 includes route locations section 702, departure time section 704, sort section 706, weather section 708, and available modes of transportation section 710. It should be noted that step 106 may be displayed with any GUI, more or fewer sections and data, and/or any configuration of data.

Weather section 708 may include a visual indicator of weather (e.g., the sun symbol of FIG. 8). The visual indicator may be the current weather for that point along the route, including, but not limited to, the start location, locations along a route, a location to access a mode of transportation, and/or the destination location. Additionally and alternatively, a weather indicator may indicate predicted weather at the destination location at an estimated (or, in some embodiments, an average estimated) time of arrival. In some examples, actual weather may be displayed as part of a map (e.g., electronic map 1110 of FIG. 12.) The actual weather may be represented on the map as radar images and/or animations. The user may then see a visual indication of where a particular weather pattern currently is and/or where the weather pattern is going. In some examples, the order of routes are displayed and/or the routes themselves may be influenced by the weather. For example, a developer may assume snow would slow traffic and would either direct around areas expect to get snow during the estimate travel time.

Departure time section 704 may be set by user. For example, a user may select the current time, "now," as the departure time (as illustrated in FIG. 8) and/or any time in the future. Available modes of transportation section 710 of FIG. 8 may include data related to leaving at the time in the departure time section 704 to get from the start location to the destination location of the route locations section 702 using one of the options displayed for each mode of transportation. As shown in FIG. 8, the displayed modes may include, for example, walking, biking, driving, taking public transportation, riding in a ride share service, or taking a taxi, and the displayed information may include one of the options available for each of the displayed modes. For example, in one embodiment, data related to only one route is displayed for each of walking, biking, and driving. Data related to only one route of public transportation, one ride share vehicle, and one taxi is displayed, and so on. In some embodiments, options may be displayed that utilize multiple modes of transportation (e.g., multi-modal directions). As an example, the public transportation option is a multi-modal option as it requires 0.4 miles of walking (first mode) and riding in public transportation (second mode). Multi-modal options may include any number of modes in any combination and/or order.

A route for each mode of transportation may be calculated based on the received start and destination locations and accessed mapping/routing data. The routes may be calculated by mapping routing server 40 of FIG. 1. The data related to each option may be received from condition source/database 70 of FIG. 1, a traffic server, or third party transportation API 60 (e.g., wait time and/or number of available cars within a certain distance may be received from a ride share API; and/or current delay times, distance to access of public transportation, and/or number of transfers to reach destination may be received from a public transportation API). Some data, including but not limited to, historical/average speeds, speed limits, elevation changes, terrain, number of stop signs/traffic signals, weather, and/or road type along a route may be stored in a database, such as, for example, condition source/database 70 or a server, such as, for example, route condition server 45.

In step 106, any data related to the modes of transportation may be displayed. For example, as shown in FIG. 8, for each available mode of transportation, an estimated time to reach the destination location and/or an estimated cost of reaching the destination location may be displayed (e.g., far right two columns in the available modes of transportation section 710). In some embodiments, the data displayed in the available modes of transportation section 710 may include the "arrive by" time for some or all of the displayed options. In some embodiments, different data may be displayed for different modes of transportation. For example, as shown FIG. 8, the data related to an option (e.g., a route) for walking to the destination location may include, but is not limited to, an approximate number of calories that will be burned (e.g., based on human averages, national averages, city averages, gender averages, and/or the specifics statistics of the user), distance with sidewalks, terrain (e.g., smoothness of path), distance with dedicated bike/walk paths, distance on two/four/six lane roads, number of stop lights, and/or the total distance the user will need to walk to reach the destination location. In another example, the data related to an option (e.g., a route) for biking to the destination location may include, but is not limited to, the change in elevation including whether that change is higher or lower (as shown in the second to left column of available modes of transportation section 710), the rate at which elevation changes, the terrain (e.g., smoothness of the path), distance with and without bike lanes, distance on dedicated bike trails, approximate calories burned, and/or total distance (as shown in the second to left column of available modes of transportation section 710).

In examples in which the available mode of transportation is driving or driving with a ride share, car share, or taxi, displayed data may include traffic volume (e.g., light traffic, medium traffic, heavy traffic, standstill, etc.), number and/or cost of tolls, type of roads to be travelled (e.g., two-lane roads, highways, dirt roads, etc.), number of stop signs/traffic lights, number of turns, and/or total distance to the destination location. In examples in which an available mode of transportation involves waiting for the transportation to arrive (e.g., public transportation, ride share, and/or taxi), displayed data may include wait time, ratings of driver or system, average delay, current delay, etc. In an example in which a user must travel to access the mode of transportation (e.g., public transportation, intercity buses, intercity trains, car share, bike share, etc.), the displayed data may include distance to transportation (e.g., distance to bus stop), walk time to transportation, etc. Other data may include number of ride share cars, car share cars, and/or bike share bikes available within a certain distance of the start location, the type of car share cars and/or ride share cars available, the number of transfers (e.g., for public transportation, intercity buses, intercity trains, planes), and/or any other information related to an option for a mode of transportation.

Figure 9:
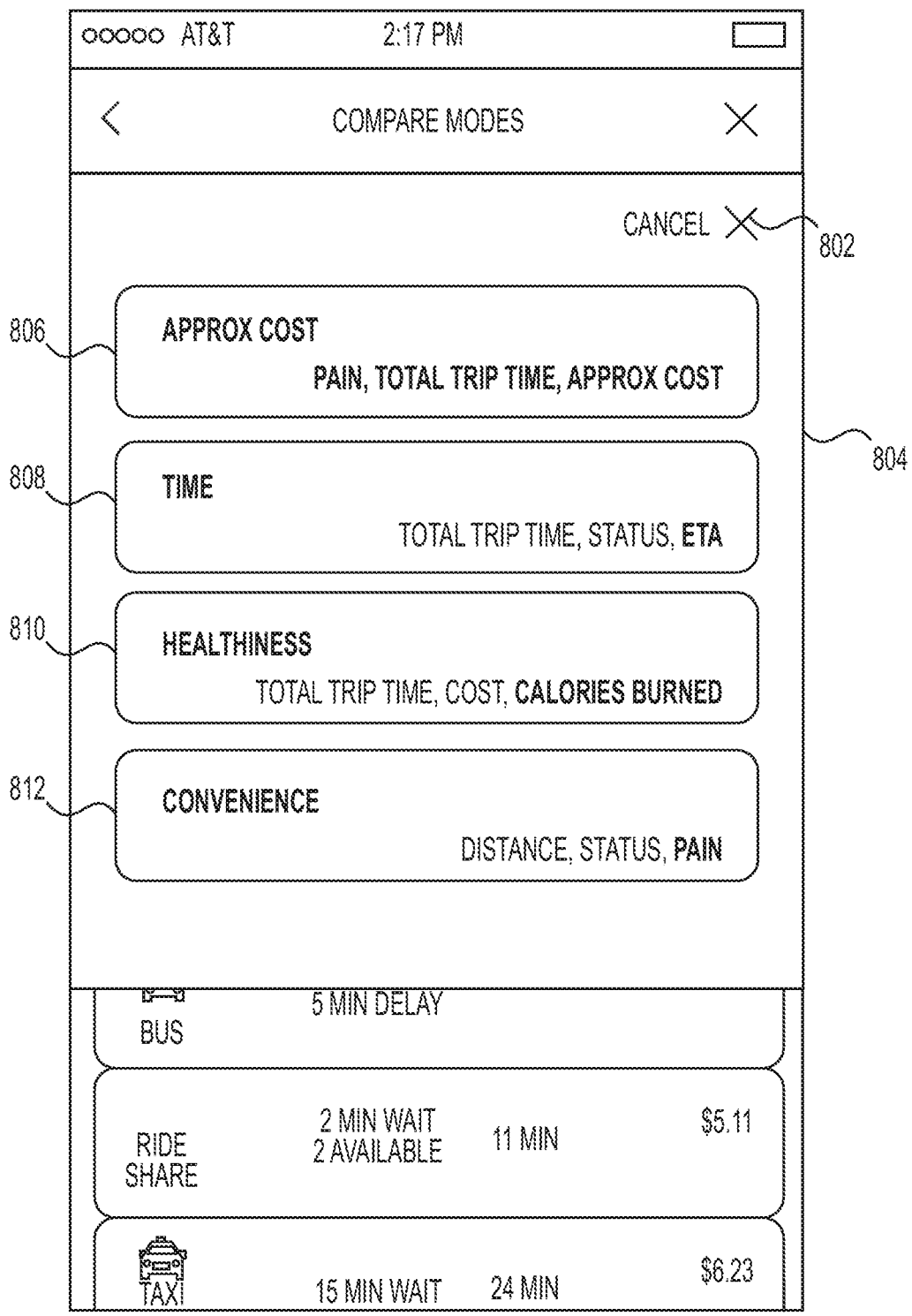
FIG. 9 is a schematic view of an exemplary GUI for display and selection of criteria for sorting the various modes of transportation, according to an exemplary embodiment of the present disclosure.

As described with respect to FIGS. 3-7, the display of modes of transportation may customized by the user. Additionally or alternatively to the customization described above, available modes of transportation may be sorted by the user. For example, as shown in FIG. 8, the sort section 706 is set to sort by approximate cost. This setting may be an initial setting, may be assumed by the developer, and/or may be set by the user. Since sort section 706 is set to sort by approximate cost, the available modes of transportation in the available modes of transportation section 710 are listed in order of approximate cost with the least expensive (e.g., free) listed first and continuing down as the mode of transportation becomes more expensive to reach the destination location. It should be noted that sorting may be done at any time, including, as initial set-up, when the destination location is input, and/or as shown in FIGS. 8-10, e.g., after data related to various modes is displayed for comparison.

The sorting of modes of transportation may be changed in any way. In the example shown in FIG. 8, a user may select the sort section 706. In some examples, sort section 706 may be a drop down menu. In some examples, selecting the sort section 706 may cause a new GUI to be displayed. In one example, as shown in FIG. 9, sort categories section 802 may be displayed over the compare modes GUI of FIG. 7. The available modes of transportation may be sorted by any criteria, including, but not limited to those illustrated in FIG. 9, including approximate cost 806, time 808, healthiness 810, and/or convenience 812. Other, not shown, examples of categories for sorting include environmental impact, safety, time the user will be in the elements, scenery, etc. As shown in FIG. 9, some of the criteria for each sort category is displayed as bold text (e.g., "ETA" in time 808, "calories burned" in healthiness 810, and "pain" in convenience 812). In some embodiments, aspects of each sort category may be weighed differently. The aspects displayed with bold text in the GUI of FIG. 9 may, for example, carry more weight in a sorting algorithm. For example, the "ETA" may have a greater effect on which routes or options are displayed and/or the order of display than the total trip time and/or status when the user chooses to select time as the sort category.

Figure 10:
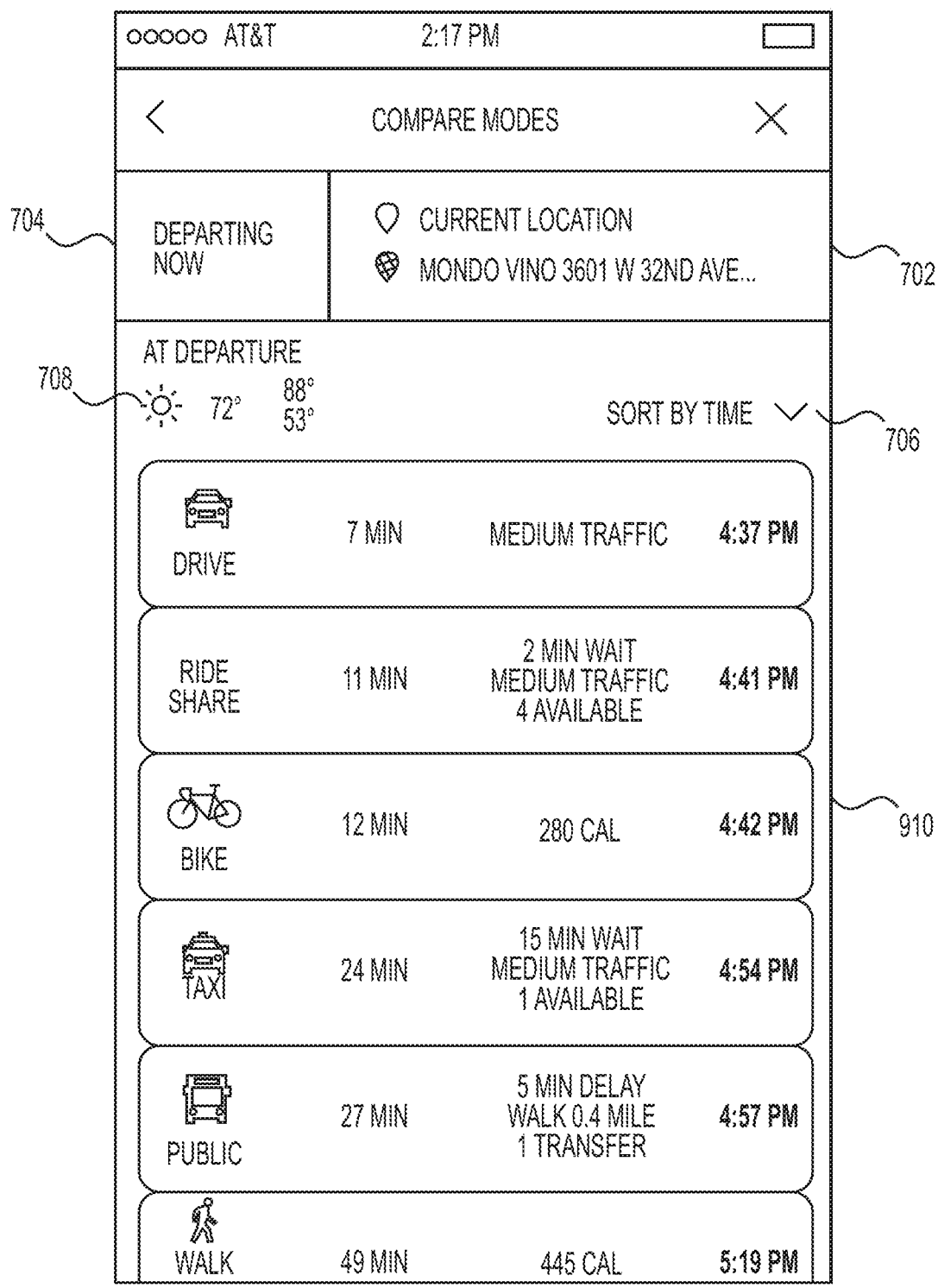
FIG. 10 is a schematic view of an exemplary GUI for display and a comparison of at least one option for each of the various modes of transportation sorted by, in this case, e.g., an approximate arrival time at the destination location, according to an exemplary embodiment of the present disclosure.

FIG. 10 illustrates an exemplary GUI of when the modes of transportation are sorted by time. In this example, the mode of transportation with the earliest arrival time (e.g., driving) is listed first within modes of transportation section 910.

In some examples, the options for each mode of transportation may additionally or alternatively be sorted based on a characteristic (e.g., by the selection of a category of the sort selection 706). For example, it may be determined that the driving mode of transportation may have several options (e.g., routes) to drive from the start location to the destination location. A first route may take seven minutes but involve five dollars in tolls and the second route may take nine minutes but have no tolls. If the selected sort category is the characteristic of approximate cost (e.g., walking and biking may be listed first, like in FIG. 8), not only would the order of the modes of transportation change so that the least expensive is listed first, the option for each mode of transportation may change (e.g., for the driving option, the second route may be displayed because it has no tolls). If the selected sort category is the characteristic of time instead, the order of the modes of transportation may change (e.g., walking may take the most amount of time and may therefore be listed last) and/or the displayed option for each mode of transportation may change (e.g., the first route may be displayed as it takes two less minutes than the toll-free route).

In some examples, the sort category selected may affect the data that is displayed in the GUI. In some examples, a quantitative value for the characteristic of the selected sort category may be displayed in the far right column of available modes of transportation section. For example, as shown in the GUI illustrated in FIG. 8 (e.g., when the characteristic of approximate cost is the selected sort category), a quantitative value for the characteristic of approximate cost for each mode of transportation is the data that is displayed in the far right column of the available modes of transportation section 710. Similarly, as shown in the GUI illustrated in FIG. 10 (e.g., when the characteristic of time is the selected sort category), a quantitative value for the characteristic of time for each mode of transportation is the data that is displayed in the far right column of the available modes of transportation section 910. FIGS. 8 and 10 are merely exemplary and the characteristic related to the selected sort category may be displayed anywhere in the GUI.

Returning again to method 100 of FIG. 2, once data for at least one option for each of the various modes of transportation has been generated and displayed in step 106, method 100 may proceed to step 108. In step 108, a selection of one of the various modes of transportation may be received from the user over the network. In some examples, a user may select public transportation from a GUI displaying at least one option for each of the various modes of transportation (e.g., step 106 and/or a selection from available modes of transportation section 710 of FIG. 8 and/or available modes of transportation section 910 of FIG. 10). It should be noted that in some examples, a user may select public transportation from the GUIs of FIGS. 3, 4 and/or 5, essentially skipping steps 104 and 106.

Figure 11:
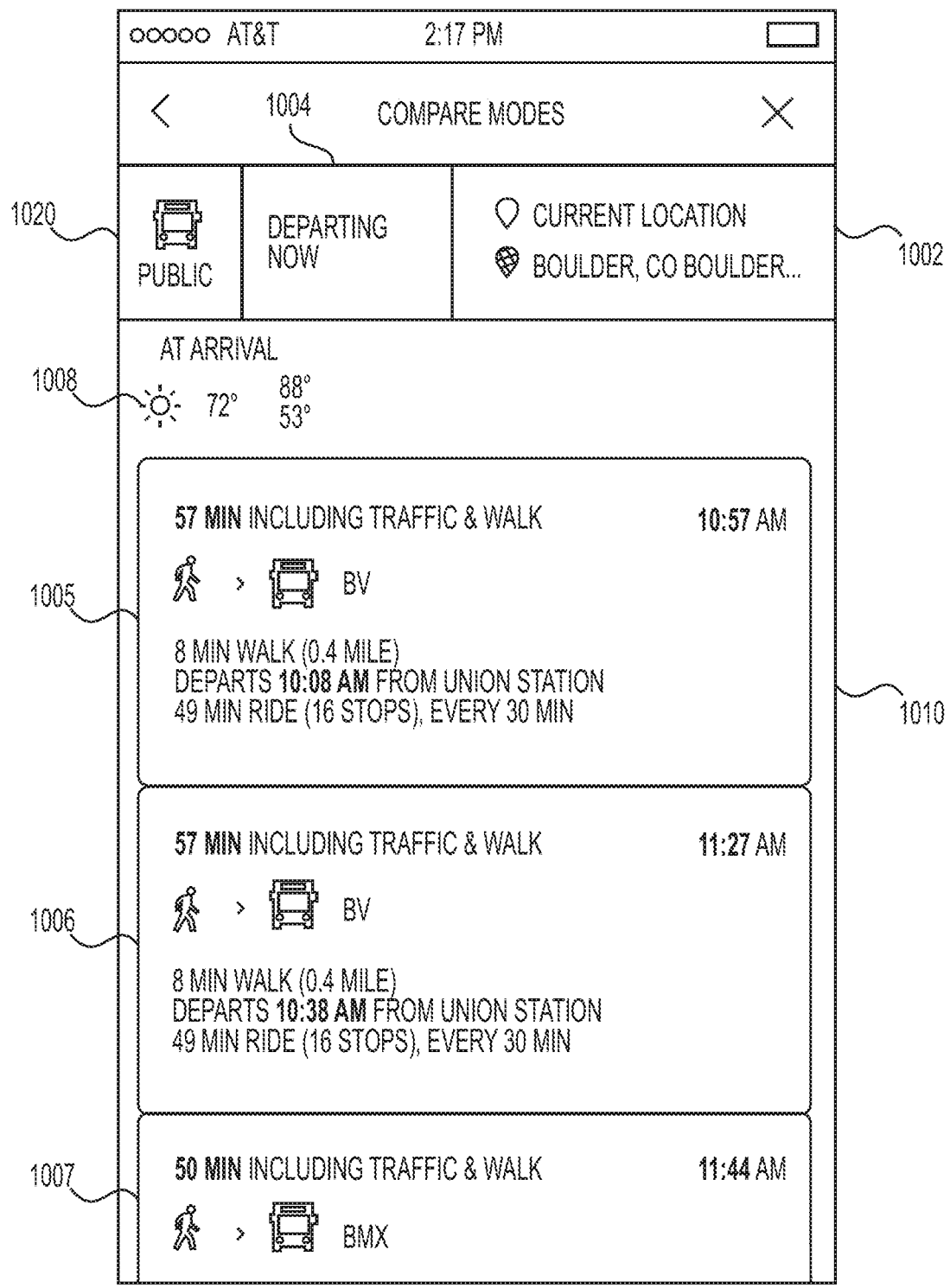
FIG. 11 is a schematic view of an exemplary GUI for display and selection of multiple options of public transportation as the selected mode of transportation, according to an exemplary embodiment of the present disclosure.

Multiple options for the selected mode of transportation may be generated and/or displayed (step 110). The generation and/or display may be performed by mapping routing server 40 and/or UI servers 50. In some examples, these multiple options may have previously been generated in or before step 106. In some examples, only one option for each mode of transportation is generated in step 106 and additional options are generated in step 110. FIG. 11 illustrates an example of multiple options being displayed when a user selected public transportation (e.g., selecting public transportation from FIG. 3, 5, 8, or 10). The GUI of FIG. 11 includes route locations section 1002, departure time section 1004, selected mode 1020, weather section 1008, available options section 1010, and available options 1005, 1006, and 1007. In some examples, weather section 1008 may display weather at the arrival time and location (as shown in FIG. 11), the departure time and location, along the route, the highs and lows for the day, the current weather, etc.

Available options section 1010 may include any number of options for the selected mode of transportation. In the example shown in FIG. 11, three options (options 1005, 1006, and 1007) of public transportation are displayed. Data related to each option may be displayed. For example, the displayed data may include the estimate time of arrival, the various bus/subways lines, number of transfers, cost, the walk time/distance involved before and/or after accessing the public transportation, the total ride time, the number of stops, the departure time, and/or the frequency at which the bus/subway departs.

Figure 12:
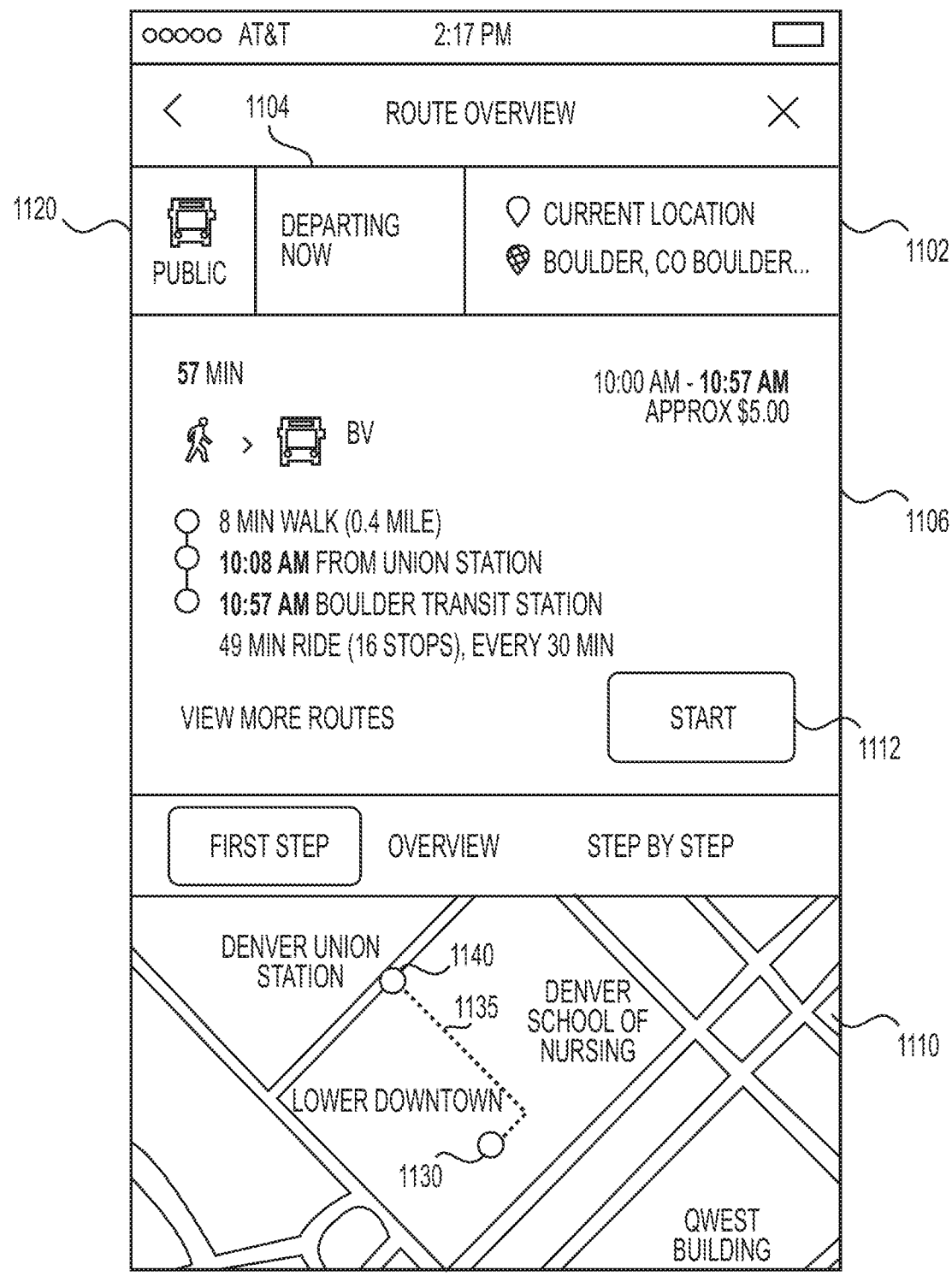
FIG. 12 is a schematic view of an exemplary GUI for display of a way to access a selected option for public transportation, according to an exemplary embodiment of the present disclosure.

Once the multiple options for the selected mode of transportation are displayed (e.g., FIG. 11) in step 110, a selection of one of the options may be received from the user over the network (step 112). A route for and/or way to access the selected option may be generated and displayed in step 114. FIG. 12 illustrates an exemplary GUI when a user selects one of multiple options displayed for public transportation (e.g., selection of option 1005 of FIG. 11). In FIG. 12, a way to access the selected public transportation, the "First Step," is displayed. In addition, a route locations section 1102, a departure time section 1104, a selected mode of transportation section 1120, a selected option information section 1106, a start button 1112, and an electronic map 1110 may also be displayed. It should be noted that FIG. 12 is merely exemplary and the GUI generated in step 114 of method 100 may include any information, including any combination of the information displayed in FIG. 12, information related to the route, information related to how to access the mode of transportation, any information a user may desire to view, etc. Electronic map 1110 may include a start location 1130 and an access location 1140 (e.g., the location to access the selected mode of transportation.)

The electronic map 1110 may be of any suitable form and/or type of view, such as a map view, satellite view, live traffic view, etc. The electronic map 1110 may be any suitable size to be displayed by an electronic device. It should be noted that the description of electronic map 1110 may be applied to electronic map 1210 of FIG. 13, electronic map 1310 of FIG. 14, electronic map 1410 of FIG. 15, electronic map 1610 of FIG. 17, and/or electronic map 1710 of FIG. 18.

The view of the electronic map 1110 may be manipulated in any suitable manner (e.g., zoomed in and out, rotated, panned, etc.). The electronic map 1110 may be of any scale, e.g., transcontinental, continental, region, state, city, neighborhood, campus, etc. The electronic map 1110 also may include various identifiers, e.g., geographic markers, landmarks, road names, etc. and may be automatically electronically updated.

The electronic map 1110 may include a route between a start location 1130 and one or more locations (e.g., access to public transportation 1140 or destination location listed in route information section 1102). The locations may be any locations identifiable on the electronic map, for example, a specific address (e.g., 123 Green St. Any town, CA), point of interest ("POI") location (e.g., Wrigley Field), general geographic location (e.g., Denver, Colo.), intersection (e.g., 1$^{st}$ St. and Broadway, exit 29A), access point for mode of transportation (e.g., metro station), etc. The start and access locations 1130, 1140 may be any distance from each other and/or any direction relative to each other. The route 1135 may be determined or received in any way.

The route 1135 may be along one or more portions of local streets, highways, bridges, etc. The route 1135 may be traversed in any suitable manner, e.g., via motor vehicle, bicycle, foot, public transit, plane, boat, etc. The route 1135 also may include various visual indicators to identify various attributes of the route 1135. For example, traffic flow along the route 1135 at various times may be identified using different colors or combination of colors, visual effects (e.g., animation, pop-up notes, etc.), etc. Road restrictions, tolls, bridge heights, construction, etc., also may be shown along the route 1135.

Figure 13:
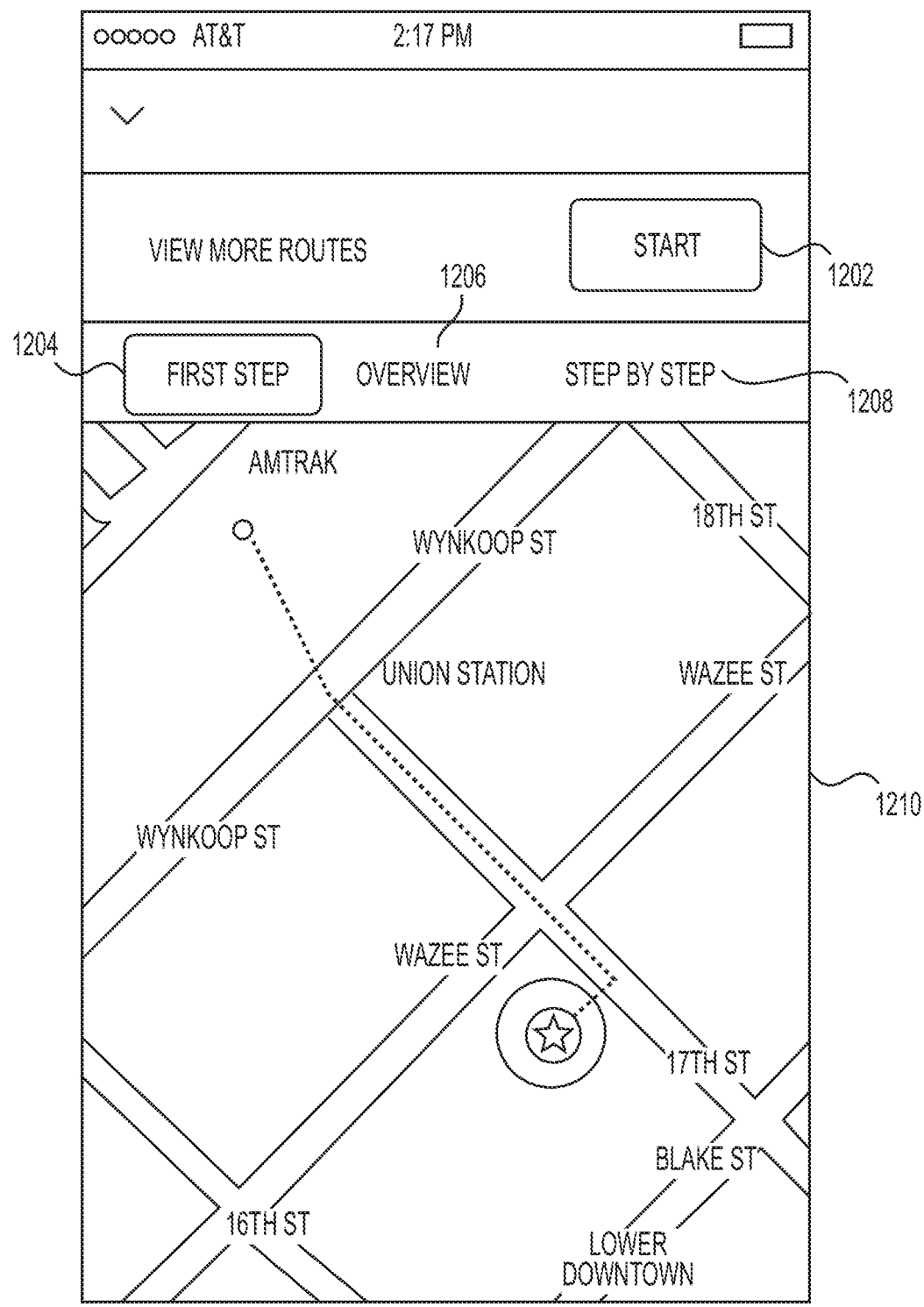
FIG. 13 is a schematic view of an exemplary GUI for display of a way to access a selected option, e.g., of intercity trains, according to an exemplary embodiment of the present disclosure.

As previously mentioned, method 100 may include more or fewer steps than those illustrated in FIG. 2. FIGS. 13-18 illustrate examples in which step(s) are not performed, steps are combined, and/or steps are performed out of order. In one example, once data related to at least one option for each of various modes of transportation is generated and displayed (step 106 and/or FIG. 8) and a user selects one of these modes (step 108), method 100 may proceed directly to step 114 and a route for and/or way to access the selected mode of transportation may be generated and displayed. In an example in which a user selects intercity trains (e.g., Amtrak), a way to access the intercity train station may be displayed. FIG. 13 illustrates such an example. FIG. 13 includes a start button 1202, first step option button 1204, overview button 1206, step by step button 1208, and electronic map 1210. Electronic map 1210 may include the start location, access location (e.g., location to access the Amtrak train), and a route to get from the start location to the destination location. Selecting first step button 1202 may display the first step in the directions. In the example of FIG. 13, the first step in directions may include accessing the mode of transportation (e.g., travelling from the start location to the intercity train station). Selecting the overview button 1206 may display the entire route from start location to destination location and step by step button 1208 may allow the user to view one step of the directions at a time or a list.

Figure 14:
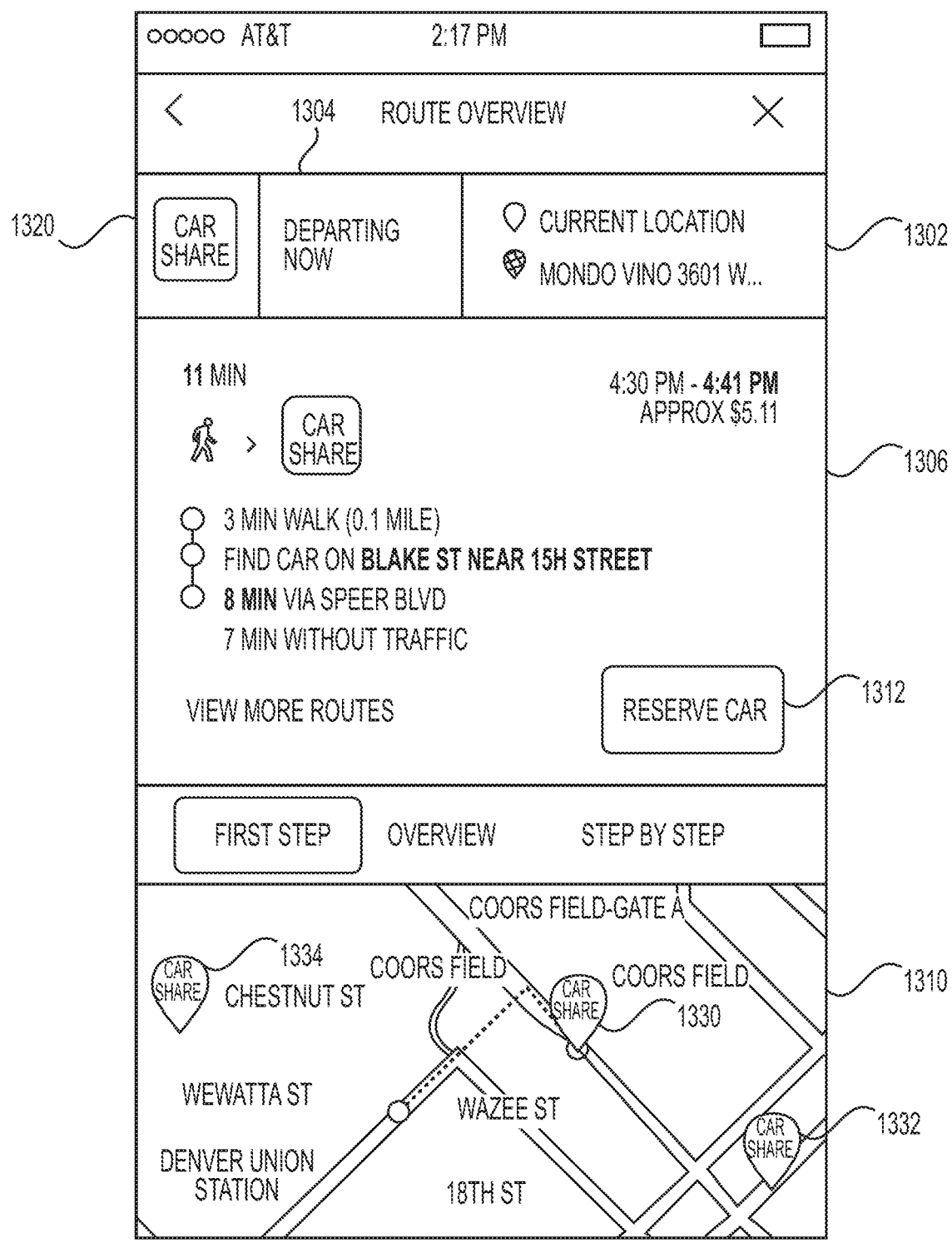
FIG. 14 is a schematic view of an exemplary GUI for display of both (1) multiple options of a transportation mode, e.g., for a car share service, and (2) a way to access a selected option for the car share service, according to an exemplary embodiment of the present disclosure.

In some embodiments, multiple steps of method 100 may be combined and/or displayed in a single GUI. For example, within the same GUI, multiple options for a selected mode of transportation are displayed (e.g., step 110) and a way to access at least one option of the selected mode of transportation is displayed (e.g., step 114). Such an embodiment, wherein a user selected a car share service as the mode of transportation, is illustrated in FIG. 14. For example, electronic map 1310 of FIG. 14 may include multiple options for the car share service. For example, a user may select a car share icon 1330, 1332, or 1334 to reserve a car at a location corresponding to the location of the car share icon in electronic map 1310.

FIG. 14 also includes a route locations section 1302, a departure time section 1304, a selected mode of transportation section 1320, a selected option information section 1306, and a reserve car button 1312. Selected option information section 1306 may include any information related to the selected route, including but not limited to, travel time or distance to the nearest available car, location of nearest available car, current traffic along route, estimated time for driving (including with current traffic and without traffic), the approximate cost, the approximate departure and arrival times, the type of car available, an option to view more routes, etc. If a user selects the reserve car button 1312, the user may be directed to the car share partner's client application and/or web page.

In some embodiments, the application may reserve a car automatically, without additional user action, when the user selects the reserve car button 1312. In such embodiments, the automatically reserved car may be the nearest car to the start location, the cheapest car, and/or the car that would result in the earliest arrival time (e.g., one car may be closer, but it is on a street facing in the opposite direction of the destination location). It should be noted that FIG. 14 is merely exemplary and the display generated in steps 110 and/or 114 of method 100 may include any information, including any combination of the information displayed in FIG. 14, information related to the route, information related to how to access the mode of transportation, any information a user may desire to view, etc.

Figure 15:
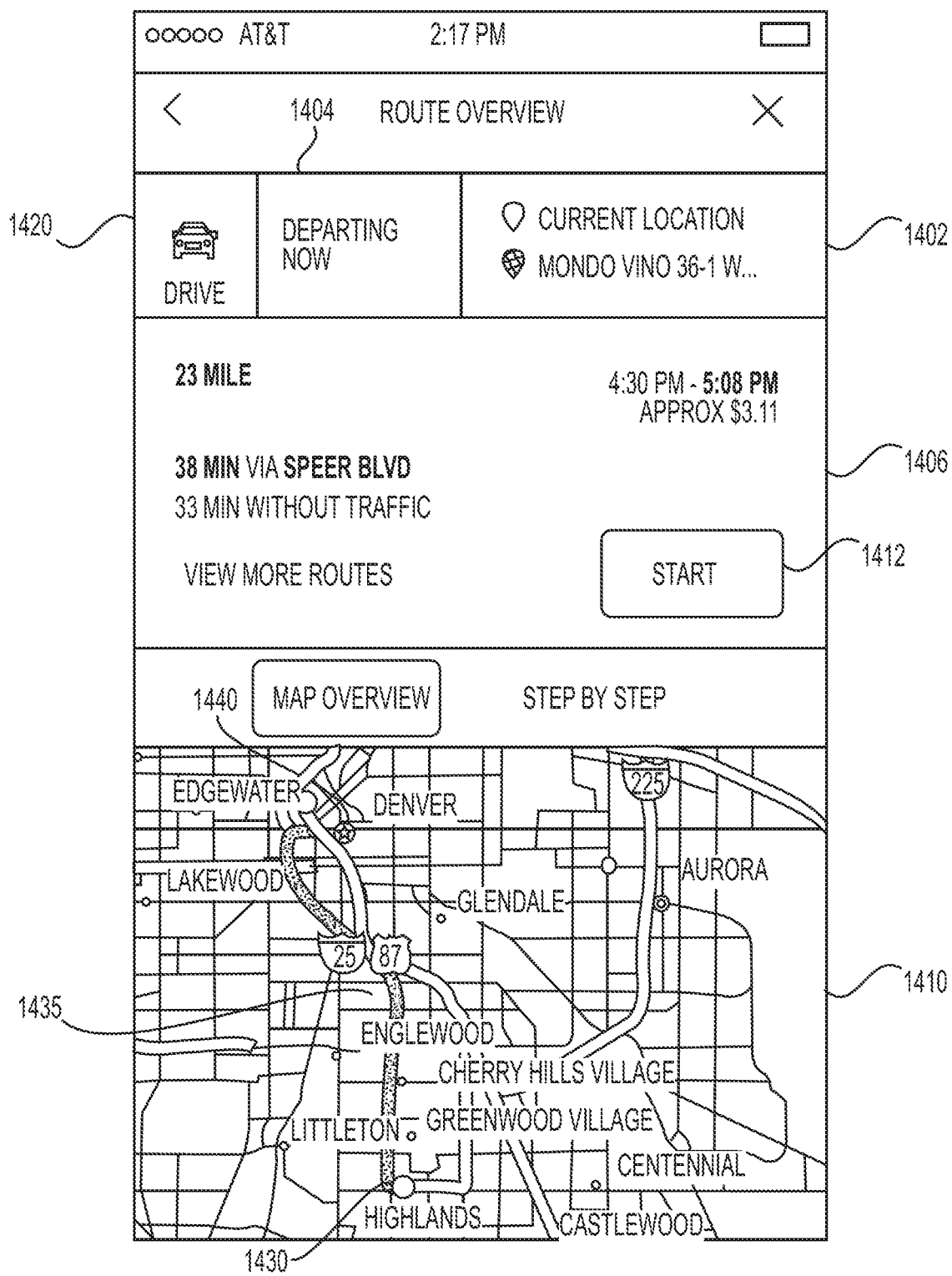
FIG. 15 is a schematic view of an exemplary GUI for display of data related to driving to a destination and a route for driving to a destination location, according to an exemplary embodiment of the present disclosure.

In some examples, steps 110 and 112 may not be performed, and once a selection of one of the various modes of transportation is selected, method 100 may proceed to step 114 and generate and display a route for the selected mode of transportation. For example, if a user selects drive (in step 108, from FIG. 7 or 9, and/or route directions after selecting car share or ride share), a route may be displayed for driving from a start location to a destination location. FIG. 15 illustrates a resulting exemplary GUI. In FIG. 15, only one option (e.g., a single route 1435 from start location 1430 to destination location 1440 of electronic map 1410) is displayed. The route may be determined in any way, including but not limited to, set user preferences (e.g., set preferences of FIG. 7), sorting of modes of transportation (e.g., sort section 706 of FIGS. 8 and 10), initial settings, developer assumptions (e.g., an assumption that users prefer the shortest route), etc.

FIG. 15 also includes a route locations section 1402, a departure time section 1404, a selected mode of transportation section 1420, a route information section 1406, and a start button 1412. Route information section 1406 may include distance to travel, approximate current time to destination, approximate time to destination without traffic, approximate departure and arrival times, approximate cost, approximate time to park, approximate cost to park, walking time/distance from average parking spot, option to access more routes, carbon footprint, number of stop signs, turns, and/or stop lights, number of police along the route, etc. It should be noted that FIG. 15 is merely exemplary and the displayed/generated information from step 114 of method 100 and/or a selection of driving may include any information, including any combination of the information displayed in FIG. 15, information related to the route, information related to how to access the mode of transportation, any information a user may desire to view, etc.

Figure 16:
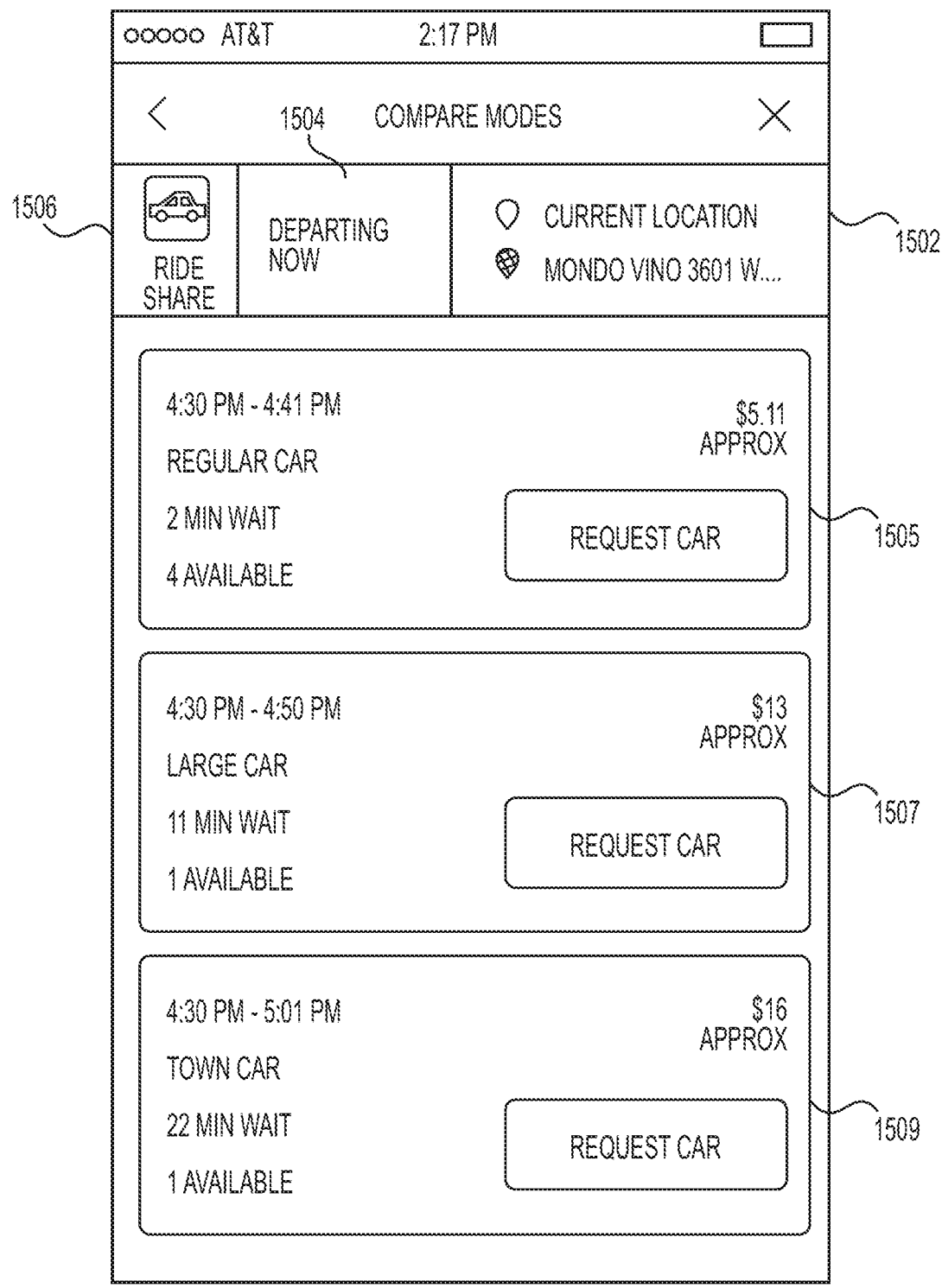
FIG. 16 is a schematic view of an exemplary GUI for display of multiple options for a selection of ride share as the mode of transportation, according to an exemplary embodiment of the present disclosure.

In some embodiments, steps 112 and 114 of method 100 may not performed. For example, FIG. 16 illustrates an exemplary GUI resulting from a user selecting ride share as the mode of transportation in step 110. Once the ride share mode of transportation is selected, a GUI similar to that of FIG. 16 may be displayed. FIG. 16 includes a route locations section 1502, a departure time section 1504, and mode of transportation section 1506. FIG. 16 includes three types of cars to reserve. The first ride share option 1505 displays data related to regular cars (e.g., sedans), the second ride share option 1507 displays data related to large cars (e.g., SUVs, minivans, etc.), and the third ride share option 1509 displays data related to town cars (e.g., Lincoln town car). The number and type of cars displayed and/or available through a ride share partner are merely exemplary. The displayed data related to each type of ride share may include, but is not limited to, a wait time (e.g., shortest approximate weight time, average weight time), number of cars within a certain distance or time of the start location, approximate arrival of the car at current/start location, approximate arrival time at the destination location, the approximate cost, and a button to request a specific type of car (e.g., a regular car from ride share option 1505). If a user selects a button to request a ride share car, a user may be directed to the ride share partner's client application, web page, etc. and not to step 114 to display the route. In some embodiments, once a car is requested from the ride share partner, the user may automatically be returned to this client application and/or given the option to request display of the driving route/direction or the driving route/directions may automatically be displayed upon exit of the ride share partner's client application, web page, etc. It should be noted that FIG. 16 is merely exemplary and the displayed generated in steps 114 of method 100 may include any information, including any combination of the information displayed in FIG. 16, information related to the route, information related to how to access the mode of transportation, any information a user may desire to view, etc.

Similar to the selection of the car share mode of transportation resulting in FIG. 14, a selection of bike share for the mode of transportation may result in multiple options for a selected mode of transportation (e.g., step 110) and a way to access at least one option of the selected mode of transportation (e.g., step 114) displayed in a single GUI. For example, electronic map 1610 of FIG. 17 includes multiple options (e.g., locations of available bikes) for the bike share service. For example, a user may choose a bike share location by selecting a bike share icon 1630, 1632, or 1634 in electronic map 1610. Electronic map 1610 also includes a way to access at least one of the bike options (e.g., a route to travel from a start location to a location of available bike 1630).

FIG. 17 also includes a route locations section 1602, a departure time section 1604, a selected mode of transportation section 1620, a selected option information section 1606, and start directions button 1612. Selected option information section 1606 may include any information related to reserving a bike and/or biking from a start/available bike location to a destination location. For example, selected option information section 1606 may include elevation changes (including specific increases and decreases), total distance needed to travel to the bike share location and/or bike to the destination location, estimated departure and arrivals times, estimate caloric burn, estimate carbon footprint, the availability of other routes, etc. It should be noted that FIG. 17 is merely exemplary and the display generated in steps 110 and/or 114 of method 100 may include any information, including any combination of the information displayed in FIG. 17, information related to the route, information related to how to access the mode of transportation, any information a user may desire to view, etc.

Figure 18:
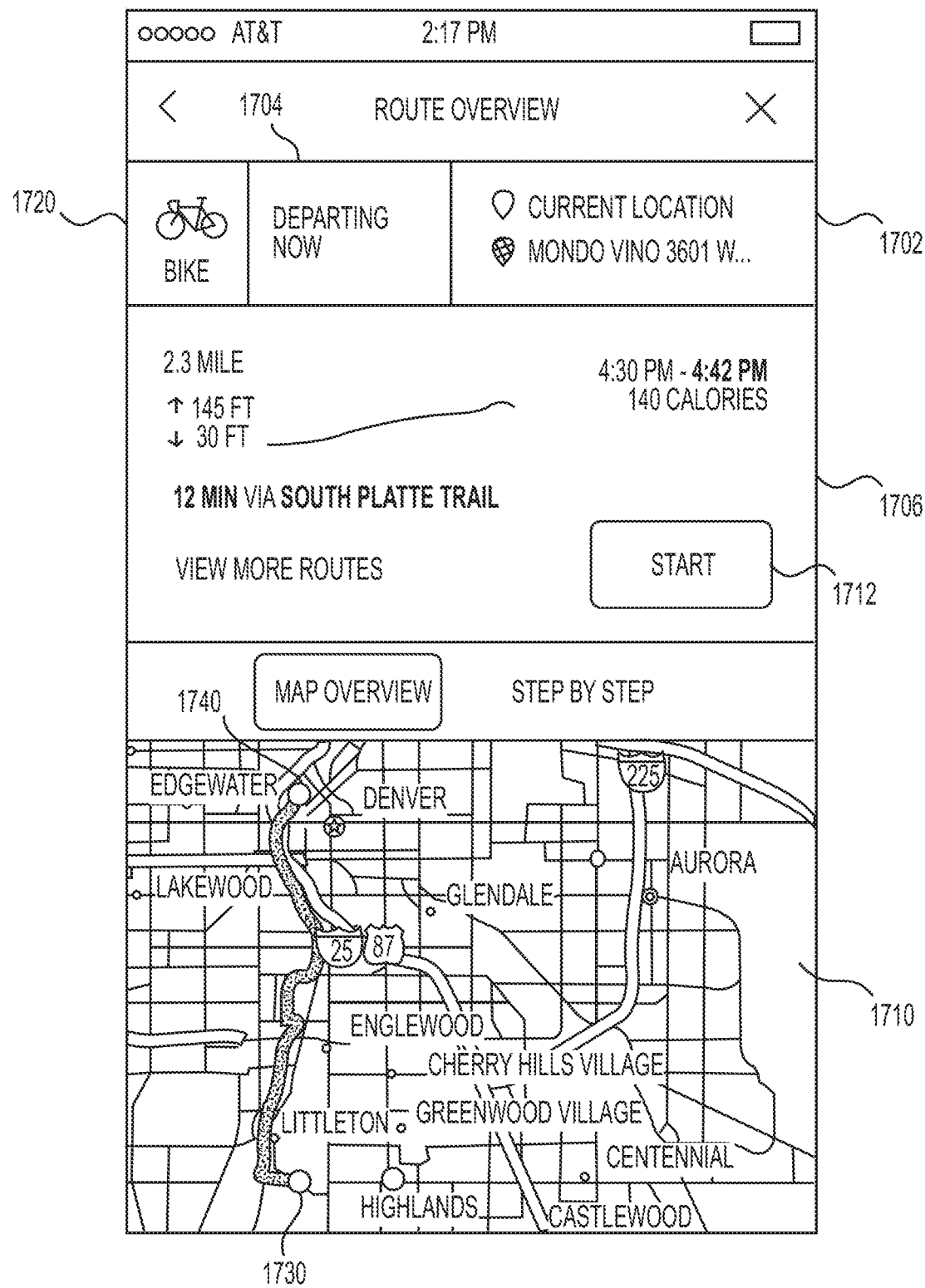
FIG. 18 is a schematic view of an exemplary GUI for display of data related to biking to a destination location and a route displayed for biking to a destination location, according to an exemplary embodiment of the present disclosure.

In some embodiments, directions to bike from a start location and/or available bike location to destination location may be displayed. For example, a user may select the start directions button 1612 from FIG. 17. In another example, a user may select the bike icon 260 from the quick directions section 210 of FIG. 5 or the bike mode of transportation from FIG. 8 or 10. In these examples, a route may be automatically displayed (e.g., step 114 of method 100), instead of performing step 110 of method 100 by displaying multiple options (e.g., routes to bike from a start to a destination location). As shown in FIG. 18, such a GUI for biking directions may include a route locations section 1702, departure time section 1704, mode of transportation section 1720, route data 1706, start direction button 1712, and/or electronic map 1710. Electronic map 1710 includes a bike route from start location 1730 to destination location 1740. It should be noted that bike routes may differ from driving routes between the same locations. For example, there may be bike paths that car cannot drive on or highways that cannot be biked on.

Selected option information section 1706 of FIG. 18 may include any information related to biking from a start location to a destination location. For example, selected option information section 1706 may include elevation changes (including specific increases and decreases), total distance to bike to the destination location, estimated departure and arrivals times, estimated caloric burn, estimated carbon footprint, the availability of other routes, weather along the route, etc. It should be noted that FIG. 18 is merely exemplary and may include any information, including any combination of the information displayed in FIG. 18, information related to the route, information related to how to access the mode of transportation, any information a user may desire to view, etc.

Figure 19:
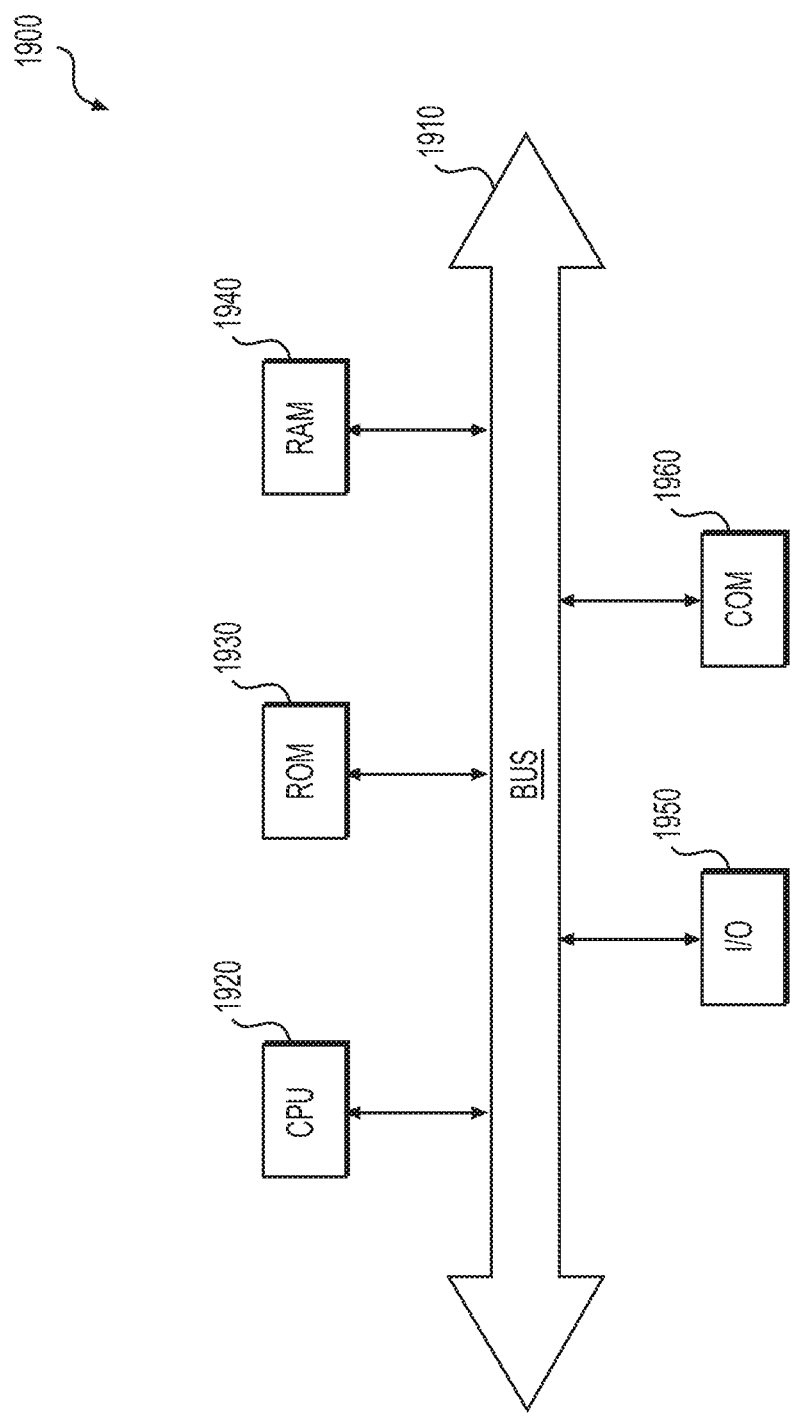
FIG. 19 is a block diagram of an exemplary computer system in which embodiments of the present disclosure may be implemented.

FIG. 19 provides a functional block diagram illustration of a computer hardware platform consistent with the present disclosure. FIG. 19 illustrates a network or host computer platform 1900, as may typically be used to implement a server like the mapping server system 35. It is believed that those skilled in the art are familiar with the structure, programming, and general operation of such computer equipment and as a result, the drawings should be self-explanatory.

A platform for a server or the like 1900, for example, may include a data communication interface for packet data communication 1960. The platform may also include a central processing unit (CPU) 1920, in the form of one or more processors, for executing program instructions. The platform typically includes an internal communication bus 1910, program storage, and data storage for various data files to be processed and/or communicated by the platform such as ROM 1930 and RAM 1940. The hardware elements, operating systems, and programming languages of such equipment are conventional in nature, and it is presumed that those skilled in the art are adequately familiar therewith. The server 1900 also may include input and output ports 1950 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, comprising:
   receiving, by a user device, a mobile device application for providing data related to multiple modes of transportation from a start location and a destination location;
   accessing, by the user device, the mobile device application;
   receiving, from a third party device, information related to at least one third party operated mode of transportation from a third party,
      the at least one third party operated mode of transportation including at least one of:
         a car share,
         a ride share,
         a bike share,
         public transportation,
         an airplane,
         a ferry, or
         a taxi;
   providing, by the user device, an option to access at least one third party application associated with the at least one third party operated mode of transportation,
      the option being provided on a user interface associated with the mobile device application;
   accessing, by the user device, services associated with the at least one third party operated mode of transportation through the at least one third party application;
   providing, by the user device, a selection of modes of transportation for selection by a user,
      the selection of modes of transportation including:
         the at least one third party operated mode of transportation, and
         at least one user operated mode of transportation,
      the selection of modes of transportation being displayed on the user interface as a plurality of icons at an alternative mode section of the user interface,
      the display being customizable so that one or more icons, of the plurality of icons, may be added by the user or removed by the user to a current quick direction section of the user interface for comparison, and
      a quantity of the plurality of icons remaining the same in the alternative mode section of the user interface when a particular icon, of the one or more icons, is added to the current quick direction section of the user interface;
   receiving, by the user device, a selection of the selection of modes of transportation,
      the selection of the selection of modes of transportation generating selected modes of transportation for comparison, and
      the selection of the selection of modes of transportation being provided at the current quick direction section of the user interface;
   determining, by the user device, data related to the at least one third party operated mode of transportation and the at least one user operated mode of transportation,
      the data related to the at least one third party operated mode of transportation including a selection option to reserve the services associated with the at least one third party operated mode of transportation;
   providing, by the user device, a list of sort categories for selection by the user,
      the list of sort categories being associated with at least one of:
         associated cost,
         travel time,
         healthiness or calories burned, or
         convenience, and
      the list of sort categories being provided via a menu;
   receiving, by the user device, a selection of a sort category from the list of sort categories from the menu; and
   displaying, by the user device and via a user interface, determined data related to the selected modes of transportation in an order based on the selection of the sort category.

2. The method of claim 1, wherein the determined data related to the selected modes of transportation include at least a characteristic related to the selected sort category.

3. The method of claim 1, wherein the determined data related to the selected modes of transportation include information related to time to arrive at the destination location, the associated cost to the user to reach the destination location, the healthiness, or the convenience.

4. The method of claim 1, further comprising:
   receiving a further selection of one of the selected modes of transportation,
      the further selection of the one of the selected of modes of transportation generating a further selected mode of transportation; and
   generating and displaying multiple options for the further selected mode of transportation.

5. The method of claim 4, further comprising:
   receiving a selection of one of the multiple options for the further selected mode of transportation; and
   generating and displaying a route for or a way to access the selected one of the multiple options.

6. The method of claim 4, wherein the multiple options are routes from the start location to the destination location.

7. The method of claim 4, wherein the multiple options are at least one of a type of car, a location to access the bike share, a location to access the car share, or a bus line.

8. The method of claim 1, wherein the at least one third party operated mode of transportation is at least one of intercity buses or intercity trains.

9. The method of claim 1, wherein the at least one user operated mode of transportation is at least one of biking, walking, running, swimming, driving, or boating.

10. The method of claim 1, where selection of the sort category from the menu causes an additional graphical user interface to be displayed.

11. The method of claim 1, where sort categories from the list of sort categories are weighted differently.

12. A user device, comprising:
one or more memories; and
one or more processors, communicatively coupled to the one or more memories, to:
  access a mobile device application for providing data related to multiple modes of transportation from a start location and a destination location;
  receive information related to at least one third party operated mode of transportation from a third party,
    the at least one third party operated mode of transportation including at least one of:
      a car share,
      a ride share,
      a bike share,
      public transportation,
      an airplane,
      a ferry, or
      a taxi;
  provide an option to access at least one third party application associated with the at least one third party operated mode of transportation,
    the option being provided on a user interface associated with the mobile device application;
  access services associated with the at least one third party operated mode of transportation through the at least one third party application;
  provide a selection of modes of transportation for selection by a user,
    the selection of modes of transportation including:
      at least one third party operated mode of transportation, and
      at least one user operated mode of transportation,
    the selection of modes of transportation being displayed on the user interface as a plurality of icons at an alternative mode section of the user interface, and
    the display being customizable so that one or more icons, of the plurality of icons, may be added by the user or removed by the user to a current quick direction section of the user interface for comparison, and
    a quantity of the plurality of icons remaining the same in the alternative mode section of the user interface when a particular icon, of the one or more icons, is added to the current quick direction section of the user interface;
  receive a selection of the selection of modes of transportation,
    the selection of the selection of modes of transportation generating selected modes of transportation for comparison, and
    the selection of the selection of modes of transportation being provided at the current quick direction section of the user interface;
  determine data related to the at least one third party operated mode of transportation and the at least one user operated mode of transportation,
    the data related to the at least one third party operated mode of transportation including a selection option to reserve the services associated with the at least one third party operated mode of transportation;
  provide a list of sort categories for selection by the user,
    the list of sort categories being associated with at least one of:
      associated cost,
      travel time,
      healthiness or calories burned, or
      convenience, and
    the list of sort categories being provided via a menu;
  receive a selection of a sort category from the list of sort categories from the menu; and
  display, via the user interface, determined data related to the selected modes of transportation in an order based on the selection of the sort category.

13. The user device of claim 12, wherein the determined data related to the selected modes of transportation include at least a characteristic related to the selection of the sort category.

14. The user device of claim 12, where the one or more processors are further to:
  receive a further selection of one of the selected modes of transportation,
    the further selection of the one of the selected of modes of transportation generating a further selected mode of transportation; and
  generate and display multiple options for the further selected mode of transportation.

15. The user device of claim 14, where the one or more processors are further to:
  receive a selection of one of the multiple options for the further selected mode of transportation; and
  generate and display a route for or a way to access the selected one of the multiple options.

16. The user device of claim 14, wherein the multiple options are routes from the start location to the destination location.

17. The user device of claim 14, wherein the multiple options are at least one of a type of car, a location to access the bike share, a location to access the car share, or a bus line.

18. The user device of claim 12, wherein the at least one third party operated mode of transportation is at least one of intercity buses or intercity trains.

19. A computer readable medium storing instructions, the instructions comprising: one or more instructions, when executed by one or more processors, cause the one or more processors to:
  access a mobile device application for providing data related to multiple modes of transportation from a start location and a destination location;
  receive information related to at least one third party operated mode of transportation from a third party,
    the at least one third party operated mode of transportation including at least one of:
      a car share,
      a ride share,
      a bike share,
      public transportation,
      an airplane,
      a ferry, or
      a taxi;
  provide an option to download at least one third party application associated with the at least one third party operated mode of transportation,
    the option being provided on a user interface associated with the mobile device application;
  access services associated with the at least one third party operated mode of transportation through the at least one third party application;
  provide a selection of modes of transportation for selection by a user, the selection of modes of transportation including:
  at least one third party operated mode of transportation, and
  at least one user operated mode of transportation,
the selection of modes of transportation being displayed on the user interface as a plurality of icons at an alternative mode section of the user interface,
the display being customizable so that one or more icons, of the plurality of icons, may be added by the user or removed by the user to a current quick direction section of the user interface for comparison, and
a quantity of the plurality of icons remaining the same in the alternative mode section of the user interface when a particular icon, of the one or more icons, is added to the current quick direction section of the user interface;
receive a selection of one of the selection of modes of transportation,
  the selection of one of the selection of modes of transportation generating selected modes of transportation for comparison, and
  the selection of the selection of modes of transportation being provided at the current quick direction section of the user interface;
determine data related to the at least one third party operated mode of transportation and at least one user operated mode of transportation,
  the data related to the at least one third party operated mode of transportation including a selection option to reserve the services associated with the at least one third party operated mode of transportation;
provide a list of sort categories for selection by the user,
  the list of sort categories being associated with at least one of:
    associated cost,
    travel time,
    healthiness or calories burned, or
    convenience, and
  the list of sort categories being provided via a menu;
receive a selection of a sort category from the list of sort categories from the menu; and
display, via the user interface, determined data related to the selected modes of transportation in an order based on the selection of the sort category.

20. The computer readable medium of claim 19, where the one or more instructions, when executed by the one or more processors, further cause the one or more processors to:
  receive a further selection of one of the selected modes of transportation,
    the further selection of one of the selected modes of transportation generating a further selected mode of transportation; and
  generate and display multiple options for the further selected mode of transportation.

* * * * *